United States Patent [19]

Marmelstein

[11] Patent Number: 5,187,788
[45] Date of Patent: Feb. 16, 1993

[54] GRAPHICS SYSTEM FOR AUTOMATIC COMPUTER CODE GENERATION

[75] Inventor: Robert E. Marmelstein, Huber Height, Ohio

[73] Assignee: The United States of America as represented by the Secretary of the Air Force, Washington, D.C.

[21] Appl. No.: 725,936

[22] Filed: Jun. 27, 1991

Related U.S. Application Data

[63] Continuation of Ser. No. 345,581, May 1, 1989, abandoned.

[51] Int. Cl.$^5$ .............................................. G06F 15/21
[52] U.S. Cl. ......................................... 395/700; 395/600; 395/650; 364/DIG. 1; 364/280.4; 364/280.7
[58] Field of Search ... 364/200 MS File, 900 MS File, 364/DIG. 1, DIG. 2; 395/600, 700

[56] References Cited

U.S. PATENT DOCUMENTS

| | | | |
|---|---|---|---|
| 4,536,840 | 8/1985 | Borta | 364/300 |
| 4,546,435 | 10/1985 | Herbert et al. | 364/300 |
| 4,656,603 | 4/1987 | Dunn | 364/900 |
| 4,703,435 | 10/1987 | Darringer et al. | 364/489 |
| 4,742,467 | 5/1988 | Messerich et al. | 364/200 |
| 4,763,277 | 8/1988 | Ashford et al. | 364/513 |
| 4,827,404 | 5/1989 | Barstow et al. | 364/200 |
| 4,831,580 | 5/1989 | Yamada | 364/900 |
| 4,949,253 | 8/1990 | Chigira et al. | 364/200 |

Primary Examiner—David L. Clark
Assistant Examiner—John C. Loomis
Attorney, Agent, or Firm—Bernard E. Franz; Donald J. Singer

[57] ABSTRACT

The Avionics Program Expert (APEX) is an automatic code generation tool for the Ada programming language (MIL-STD 1815A). It provides the programmer using APEX with the ability to quickly create a graphical representation of his initial program design. The graphical representation used by APEX is akin to a flowchart, but the interactive capabilities of the tool make design creation much faster and more efficient. Once the programmer has created his complete (or even partial) representation of a program, Ada code can then be generated with (from) APEX. The APEX program representation provides the user with three different, yet consistent, views of his program. The first view allows the programmer to lay out his initial Ada package specifications; this view is called the APEX view. A second view allows the programmer to create and manipulate complex data structures and define local variables; this view is the Data Structure view. The last view allows the programmer to define the control flow of his specific subprogram; this view is called the REM-Net view. APEX has been implanted on two host platforms; these are a Symbolics 3600 Lisp Machine and a Sun 3/XXX Workstation.

2 Claims, 24 Drawing Sheets

SAMPLE PROGRAM STRUCTURE

GRAPHICS SYSTEM FOR AUTOMATIC COMPUTER CODE GENERATION

RIGHTS OF THE GOVERNMENT

The invention described herein may be manufactured and used by or for the Government of the U.S. for all governmental purposes without the payment of any royalty.

This application is a continuation, of application Ser. No. 07/345,581, filed May 1, 1989, abandoned.

BACKGROUND OF THE INVENTION

The present invention relates generally to an automatic computer code generation tool, and more particularly to a graphics system and method for generation of code in the Ada language. The system is called the Avionics Program Expert (APEX) code generation system.

Graphical programming is a method of producing software in which the programmer employees a graphical notation to flowchart the logic. Once the graphical description of the program has been defined, it is possible to generate source code from this description. The direct result of graphical programming is that the user is able to design an application at a higher level of abstraction than is possible with a normal text editor. This technique can lead to several important advantages over traditional programming methods; some of these include:

Rapid Implementation of Design Changes
Reduction of Source Code Syntax Errors
Ability to Rapidly Prototype a Design
Automated Documentation Production Another area where graphical programming is useful is in software reuse. The concept of reusing software is not new; to date however, there have been few practical software libraries. One explanation for this is that the code contained in these libraries has been fully developed and the source files exist in text form (which is hard for programmers to quickly comprehend). The programmer who tries to reuse existing software is faced with a number of non-trivial tasks: defining what he is looking for, finding what he is looking for, understanding what he finds, and modifying it for his specific needs. With a graphical representation of existing code, the tasks of understanding what he finds and modifying it will be eased since both tasks can be done at a higher level of abstraction. Although this doesn't solve the whole problem, the combination of these factors illustrates how graphical programming can potentially increase programmer productivity.

Currently, a number of Ada code generation tools exist. These include Teamwork Ada by Cadre Technologies, Autocode by Integrated Systems, Inc., and Adagraph by the Analytical Sciences Corp (TASC). Some of these tools (like APEX) support the generation of Ada code from a graphical representation. Despite this, these tools suffer from a number of limitations.

An example of a design methodology is outlined in the book "System Design with Ada" by R.J.A. Buhr. The Buhr diagram methodology has been implemented by several popular tools (including Teamwork Ada by Cadre Technologies). However, many users of this methodology agree that it is too complex to be used in a practical manner for serious program development. Another shortcoming of these methodologies is that many methods for designing hardware (state machines, petri-nets, etc.) are used to design Ada software with no real modification. Since hardware and software production are fundamentally different, there is often an inconsistency between those methods used for hardware design and what is really needed for the design of quality Ada Software.

Many graphical design tools for Ada do produce source code from their representation. An example of such a tool is AdaGraph by The Analytic Sciences Corp. (TASC). However, many tools only generate the package specifications and not the subprogram bodies. Expressing the control flow of an individual subprogram is a key requirement for producing usuable source code. In addition, many of these tools do not support the design of key features of the Ada language such as tasking, rendevous, exception handling, and proper generation of code for Ada datatypes. Since these tools are used for design of Ada programs, the inability to represent key features of the Ada language is a serious impediment to program development with these tools. Furthermore, many of these tools produce code for a number of target languages (beside Ada) and are not optimized for the Ada language.

U.S. patents of interest include U.S. Pat. No. 4,536,840 to Borta, which discloses an automatic application program generator capable of being used with microcomputers. The patented device operates directly from information formatted onto the display screen of a computer and without program language or syntax input from the operator. Herbert et al in U.S. Pat. No. 4,546,435 describes a graphic system and computer keyboard which uses graphic symbols in the form of a flowchart. In U.S. Pat. No. 4,703,435 to Darringer et al. logic is synthesized from a flowchart level description. With a device described in U.S. Pat. No. 4,785,408 to Britton et al, the system designer uses a graphic terminal to select and interconnect modules to define the sequence of transactions needed to implement the desired voice service. Messerich et al in U.S. Pat. No. 4,742,467 are concerned with an automated method and apparatus used for creating data processing application programs in programmer oriented languages such as COBEL from individual programming language statements. The system of this patent also provides for interactive editing of the application program as it is being created at the terminal. Ashford et al in U.S. Pat. No. 4,763,277 describes a method for obtaining information in an expert system.

SUMMARY OF THE INVENTION

An objective of the invention is to provide programmers with a graphical programming environment for Ada, which provides the following benefits: (1) increased programmer productivity, (2) reduces software development time, and (3) encourages reuse of software design.

The invention is directed to an automatic code generator (APEX) for the Ada programming language. It provides a programmer with the ability to quickly create a graphical representation of his initial program design. The graphical representation is like a flowchart from which the Ada code is generated. The representation provides a programmer with three different but consistent views of his program. With a first view the programmer can lay out his initial Ada package specifications. A second view allows the programmer to create and manipulate complex data structures and define local variables. The last view allows the programmer to define the control flow of his specific subprogram. When information is changed in one view the other views are updated accordingly.

There are three editors corresponding to the three views, designated as (1) an APEX editor, (2) a Data Structure editor and (3) a REM-Net editor. (REM is applicant's initials.)

Another feature relates to a reverse engineering capability which provides a programmer with the ability to create the graphical representation of code from an existing Ada package specification.

Advantages which APEX provides over similar tools can be grouped into several different catagories. These include:

Improved Design Methodology

The APEX methodology is optimized for the production of Ada code. The icons used in the metholology have direct mappings to Ada code constructs. Without the ability to express key Ada constructs in the program design, the quality of the source code generated by any tool will be questionable. In addition the hierarchy of the APEX system provides the user with several features which are important to improving Ada programmer productivity. These features include the ability to easily specify calls to visible subprograms (in the REM-Net editor) and the ability to specify rendevous between visible tasks (also in the REM-Net editor). In many tools, these relationships are established at the package specification level. The problem with this approach is that when the body of a specific subprogram is generated, there is no way to tell precisely where the external reference emulated from in relation to the subprogram flow. With APEX, this important information is kept in the subprogram control flow graph, where it belongs. Lastly, APEX provides several different, yet consistent, views of the program. When information is deleted in one view, then the other views are updated accordingly.

Improved Code Quality

The Ada code generated by APEX represents a distinct improvement over the code generated by similar tools for a number of reasons. First, APEX provides a methodology for development which is optimized for the Ada language. Many similar tools generate code for a number of languages, however, the quality of this code is usually poor. Second, APEX generates code for the body of individual subprograms; many existing tools just generate the package specification. Lastly, the code generated by APEX can be nested to almost any degree of complexity. This is due to a special algorithm used to organize the icons in the REM-Net editor.

Summary of Unique Aspects of the System a. Makes use of multiple editors (each with its own window) to present different views of the same program to the user.

b. Provides a graphical methodology for the specification and generation of Ada code (source code).

c. Through use of a common database (FIG. 3), provides consistency between multiple editors.

DETAILED DESCRIPTION

Figure 1:
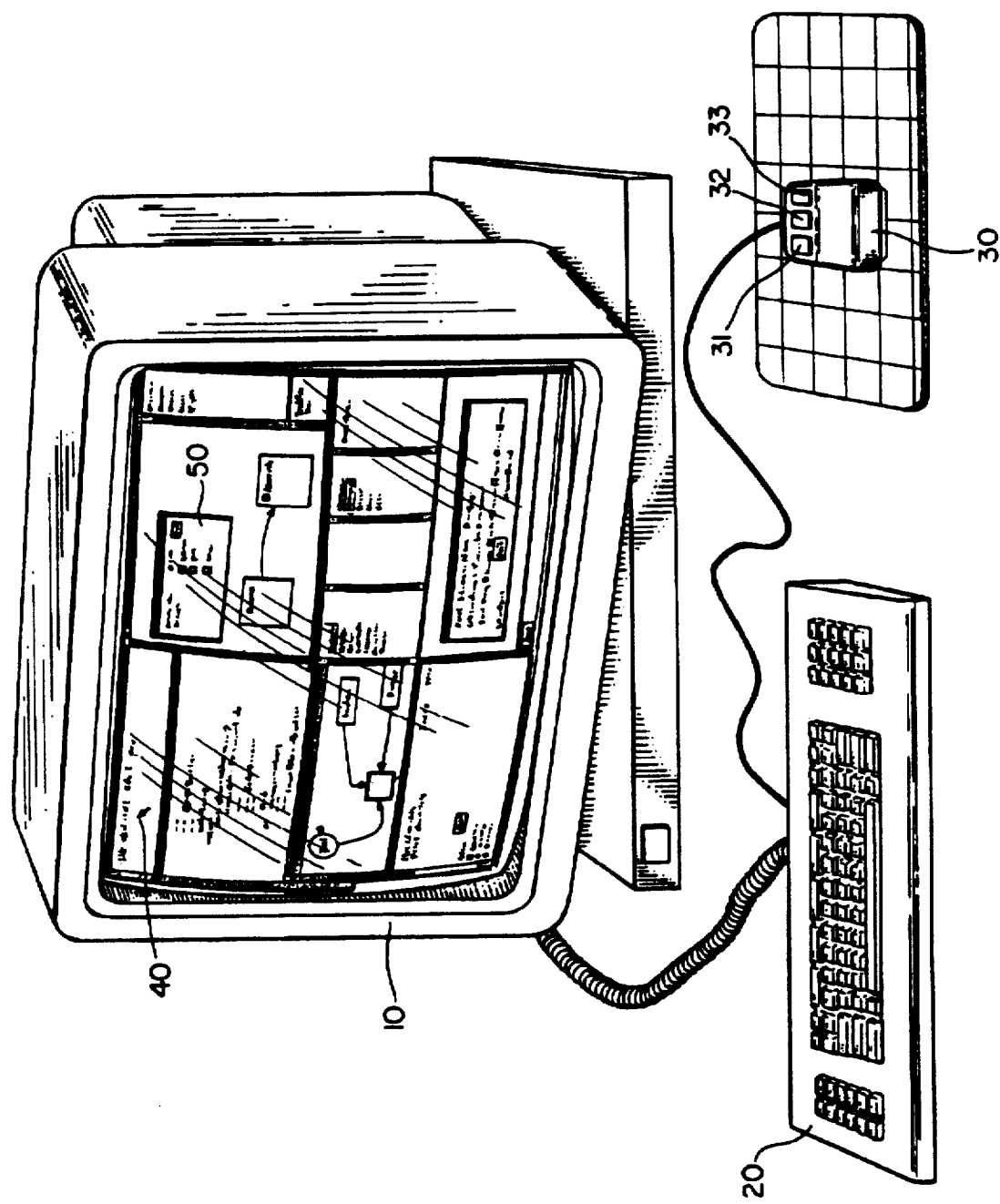
FIG. 1 is a pictorial diagram showing a workstation.

The system is described in a Technical Memorandum, AFWAL-TM-10-AAAF, titled "Avionics Program Expert Code Generation System (APEX)", with a nominal date of Aug. 15, 1988, by 1st Lt Robert Marmelstein, AF Wright Aeronautical laboratories, Avionics Laboratory, AFWAL/AAAF-3, Wright-Patterson AFB, Ohio, 45433. It is also described in a paper titled "The APEX Design Methodology" by Lt Robert Marmelstein, published in the proceedings of AdaExpo '88, Oct. 9-12, 1988, Anaheim Convention Center, Anaheim, Calif. Copies of these two publications are included with this application as filed, and are hereby incorporated by reference.

APPENDIX—COMPUTER PROGRAM LISITING

The APEX program listing written in C for the Sun Operating System 4.0 version is attached hereto as an appendix and is a part of the application as filed. Also included as part of the application as filed is a tape containing the program.

The following is a general description of each file in the APEX code listing.

a. Apexdef.c: This file holds the global declarations which are used throughout the APEX program. The global declarations include:
Definition of constants.
Definitions of essential data structures.
Header blocks for windowing and math utilities.

b. Apex.c: This file is where the main routine (the first routine to be executed) is evoked from. The main routine sets up the windows for the APEX editor and calls other routines to set up a DS editor and a REM-Net editor. After the main routine is executed, control will default to the SUN window system. Any inputs to the program will be processed by the WIN_EVENT_PROC handler for the window which the mouse is over at the time of the input. Handlers are also set up to process menu data after a menu has been exited. This file also holds routines to:
Create, edit, and delete APEX editor icons.
Input handlers for APEX editor windows.
Menu handlers for packages, operations, and data structures.
Routines to begin the loading/saving of APEX representations.

c. Apexgraph.c: This file holds routines to manipulate the graphics in the APEX editor. The graphics functions include:
Routines to draw the package connections (splines).
Routines to erase the package connections.
Routines to draw an arrow for the package connection.

Routines to determine the relative angle between the mouse and a package icon.

d. Apexada.c: This file holds the routines to generate the Ada code for the Ada package specifications defined in the APEX editor. The routines generate the Ada code for the following items:

Generation of code for Ada packages.
Generation of code for Ada operations.
Generation of code for Ada data structures.
Generation of code for Ada variables.

e. Apex-io.c: This file holds the routines to load/save the total APEX representation (for all three editors). This handles all data structures defined in Apexdef.c. In addition, this file holds the routines to reconnect transitions in the APEX and REM-Net editors. The APEX representation is an internal computer representation (in tree form) of the graphical program design. All Ada code is generated from the APEX representation.

f. Document.c: This file holds the routines used to generate the APEX subprogram cross reference and the APEX data dictionary documents.

g. Parser.c: This file holds the routines which analyze a file containing the source code for an Ada package specification. The routines in this file are used to reverse engineer Ada source code back to the appropriate APEX representation. The reverse engineering is essentially done by instantiating the appropriate data structures (defined in Apex.c) to describe the source code which is read into the parser.

h. Dse.c: This file holds the routines which comprise the Data Structure (DS) editor. The routines in this file perform the following functions:

Set up DS editor windows.
Handle input to the DS editor windows (WIN_EVENT_PROC).
Handlers for DS editor menues.
Allow the user to enter/exit the DS editor.
Display contents of each DS editor window.
data structures
record fields
local subprograms
variables
Create/edit/delete record fields and variables.

i. Petri-net.c: This file holds the routines which comprise the REM-Net editor. The routines in this file perform the following functions:

Set up the REM-Net editor windows.
Handle input to the REM-Net editor windows.
Handle routines for REM-Net icon menues.
Allow the user to enter/exit the REM-Net editor.
Routines to switch between REM-Net modes.
Create/edite delete REM-Net icons.
Draw/Erase REM-Net icons (states, slots, events).
Determine if the mouse is over a specific icon.
Display a list of visible subprograms.

j. Petri-ttrans.c: This file holds the routines to create transitions between REM-Net icons (states, slots, and events). These routines do the following: determine the source and destination of the proposed transition; determine if the transition exists; edit the transition if it exists; or create a new transition if none exists between the two icons. Transitions are drawn on the screen as multipoint splines which pass through the mouse position. There are routines in the file to calculate the polynomial which describes the spline. Lastly, there are routines in this file to delete a transition.

k. Petri-ada.c: This file holds the routines to generate the Ada subprogram bodies corresponding to the REM-Net editor representation. The routines in this file perform the following functions:

Generate the Ada code for states.
Generate the Ada code for events.
Generate the Ada code for transitions.
Assign the order to the REM-Net icons to reflect the logical ordering of the subprogram.
Sort transitions (based on the icon ordering) to reflect the level of loop nesting.

APEX USER'S GUIDE

I. Introduction

A. Graphical Programming

Graphical Programming is described in the "Background" section at the beginning of this specification.

B. System Overview

As a result of considerable research into programmer productivity, the following top level requirements for a graphical programming environment were established:

1. The design methodology must be easy to learn.
2. The programming environment must be interactive.
3. The programming environment must automatically generate both source code and documents from its representation.
4. The programming environment must support several consistent views of the program.
5. The programming design methodology must be tailored for the target language.
6. The programming environment must support the reuse of existing software.

The APEX system meets these requirements. The APEX system integrates three complementary editors; which are described below.

APEX Editor

The purpose of the APEX editor is to provide a mechanism to clearly represent package dependencies and contents. The editor allows the user to define the data types and subprograms within each package. It also allows the programmer to establish the appropriate dependencies between separate packages. This editor serves as the top level editor for the overall system; all other editors are based on the representation in the APEX editor. Graphical representations are loaded and saved using the APEX editor.

Data Structure Editor

The Data Structure (DS) editor gives the programmer the ability to edit (in detail) the data structures defined using the APEX editor. For example, while the APEX editor gives the programmer the ability to define a record data structure, the DS editor can be used to add additional fields to the record. The DS editor enforces the visibility rules of Ada by allowing the programmer to edit only those data structures which are visible to the package selected in the APEX editor. In addition, the programmer can create local declarations for visible subprograms by instantiating existing data structures. Lastly, the DS editor can be used as a query facility to obtain useful information about existing data structures and variables. The DS editor is described in depth in Section V.

REM-Net Editor

The purpose of the REM-Net editor is to provide a means of designing the subprogram body to support the generation of structured Ada code. The REM-Net editor allows the user to create icons which represent Ada specific constructs such as exceptions, rendevous, and subprogram calls. In addition, the REM-Net editor has a mechanism whereby the user can take advantage of the package specification (defined in the APEX editor) in order to more quickly create a subprogram. The full capabilities of this editor will be explained in Section IV.

II. System Installation

A. Sun 3 Workstation

Although APEX was first prototyped on a Symbolics Lisp Machine, it was quickly recognized that such a tool could be better utilized on a more inexpensive and popular workstation. As a result, APEX was ported to a Sun 3/XXX Workstation TM. The Sun version is Written in C and makes extensive use of the Sun-View TM and SunCGI TM libraries; because of this should be fairly portable across Sun systems A Sun OS 3.5 and 4.0 version of APEX are provided with the tape. It is recommended that the 4.0 version be used since it is the most up to date of the two versions.

Figure 9:
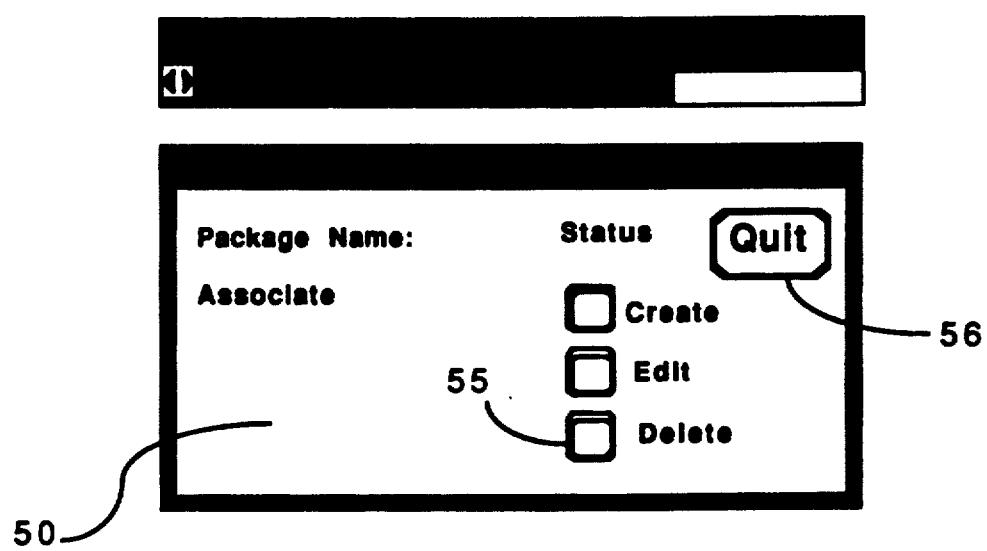
FIG. 9 shows a pop-up menu.

FIG. 1 is a pictorial diagram showing a workstation having a monitor 10, a keyboard 20 and a mouse 30. The mouse has three pushbutton switches 31, 32 and 33, the operation of which is referred to a clicking left, middle or right respectively. A mouse cursor 40 appears on the monitor screen which moves as the mouse 30 is moved. On the monitor screen there is also shown an example of a pop-up menu 50, and other APEX displays. The pop-up menu 50 is shown enlarged in FIG. 9.

Perform the following steps to install APEX:
1. Load cartridge tape into the tape drive.
2. Execute the command: >tar xvf /dev/rst8 <return>
3. The following files (at a minumum) should load:
apex
example files (turnstiles*)
4. Enter the SunTools TM utility by: >suntools
5. At this stage, APEX can be evoked by: >apex <return>

A sample APEX system file (turnstile) is supplied with the tape. This can be loaded into the APEX system by using the System Load option in the APEX command pane. The user can then learn about the system by experimenting with this sample program. The graphical views produced from this file are shown in the drawings, FIGS. 5, 6, 7 and 8, and Ada code produced is listed as the end of this specification in Section VII. This should be a useful tool in understanding the methodology presented in sections III, IV and V. A second sample file (radar) is also provided on the tape.

B. Starting Flow Chart

Figure 2:
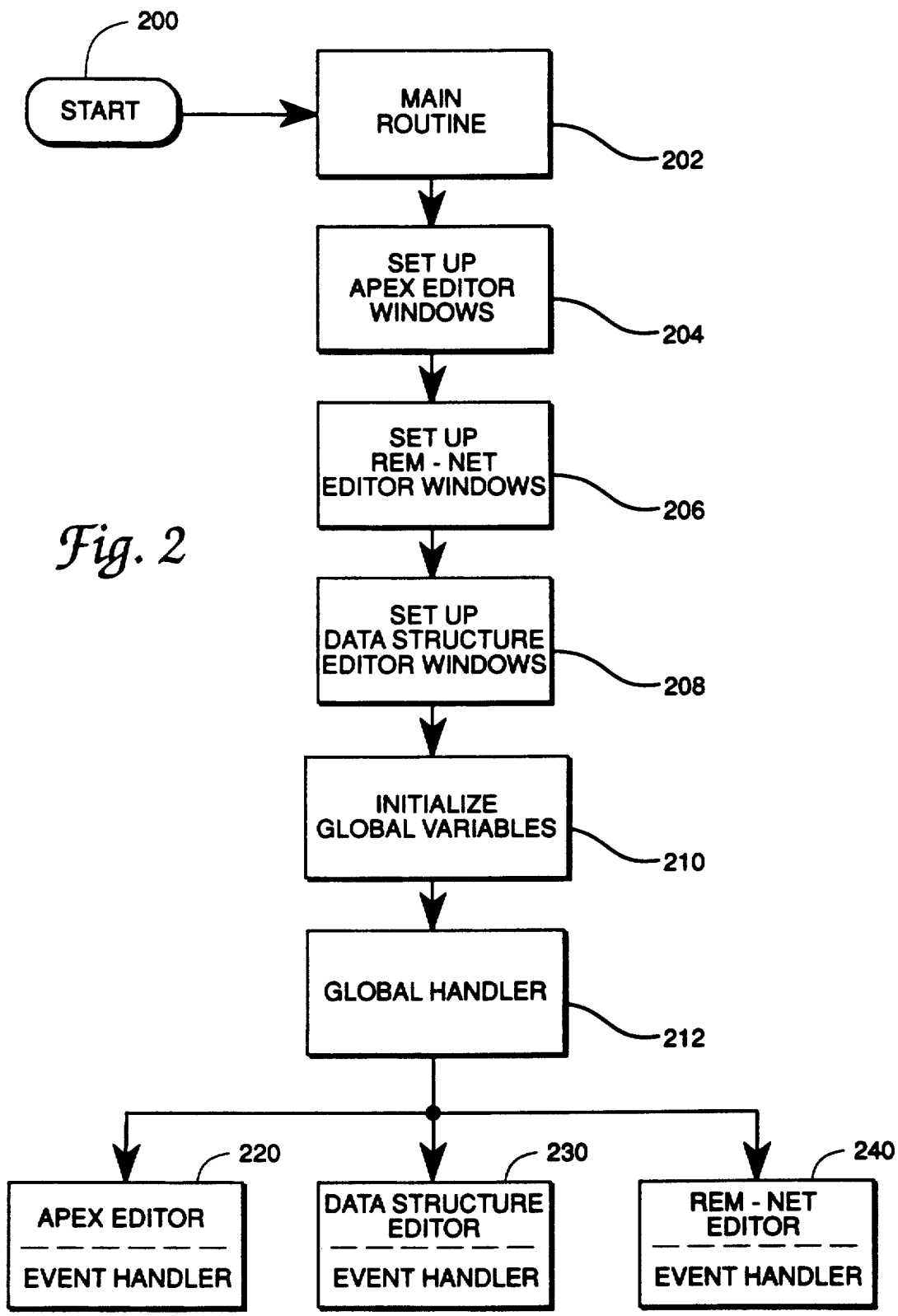
FIG. 2 is a starting flow chart;.

A starting flow chart is shown in FIG. 2. From a start block 200, the program first goes to a main routine shown as block 202. File Apex.c: is where the main routine (the first routine to be executed) is evoked from. The main routine sets up the windows for the APEX editor as shown by block 204, and calls other routines to set up a REM-Net editor as shown at block 206 and a Data Structure editor as shown at block 208. The program also includes routines to initialize global variables as shown at block 210 and for a global event handler as shown at block 212. From the global event handler the operation of the program can go to the APEX Editor 220, the Data Structure Editor 230, or the REM-Net Editor 240. An event handler will process inputs for any of the three editors. Any inputs to the program will be processed by the WIN_EVENT_PROC handler for the window which the mouse is over at the time of the input. Handlers are also set up to process menu data after a menu has been exited.

C. Sample Program Structure

Figure 3A:
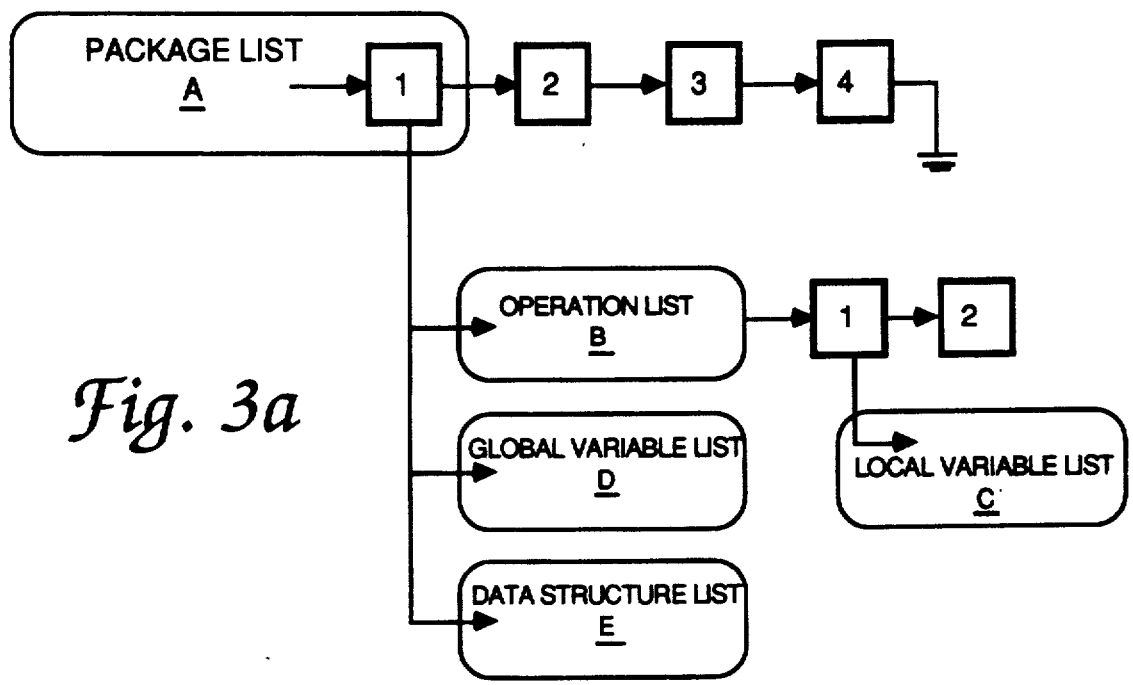
FIGS. 3a and 3b comprise a sample program structure flow chart for the APEX internal representation.
Figure 3B:
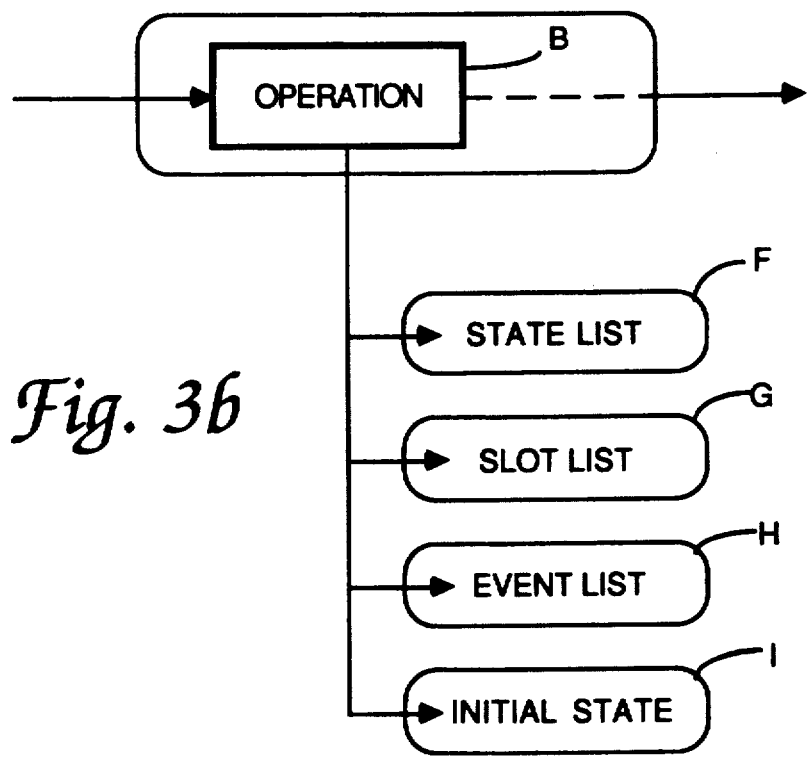

A sample program structure flow chart is shown in FIGS. 3a and 3b. The APEX editor uses a package list A, an operation list B and a data structure list E. The Data Structure editor uses an operation list B, a local variable list C, a global variable list D and a data structure list E. The REM-Net editor uses an operation list B, a state list F, a slot list G, an event list H and an initial state I.

Figure 4:
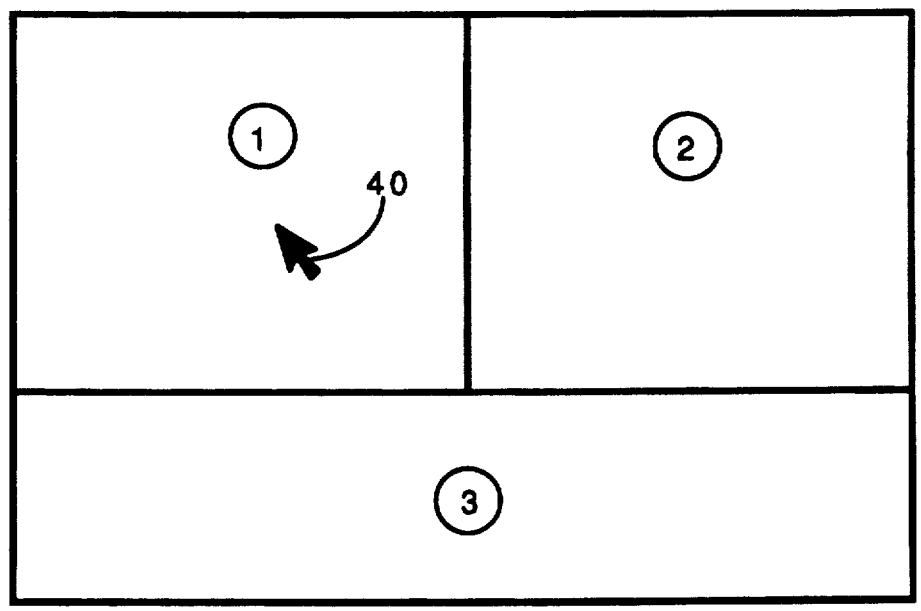
FIG. 4 shows how the three views might appear on the monitor screen.

FIG. 4 shows how the three views might appear on the monitor screen, with the APEX view in area (1), the Data Structure view in area (2), and the REM-Net view in area (3). The mouse cursor 40 may be placed in one of the areas to select a view for use by the programmer.

D. Detailed Flow Charts

Flow charts showing more details of the APEX program routines are shown in FIGS. 10-24.

1. Setup APEX Editor Windows

The flow chart of FIG. 2 shows a block 202 for a main routine, and blocks 204, 206 and 208 for set of the three editor windows, which are part of the Apex.C program file.

Figure 10:
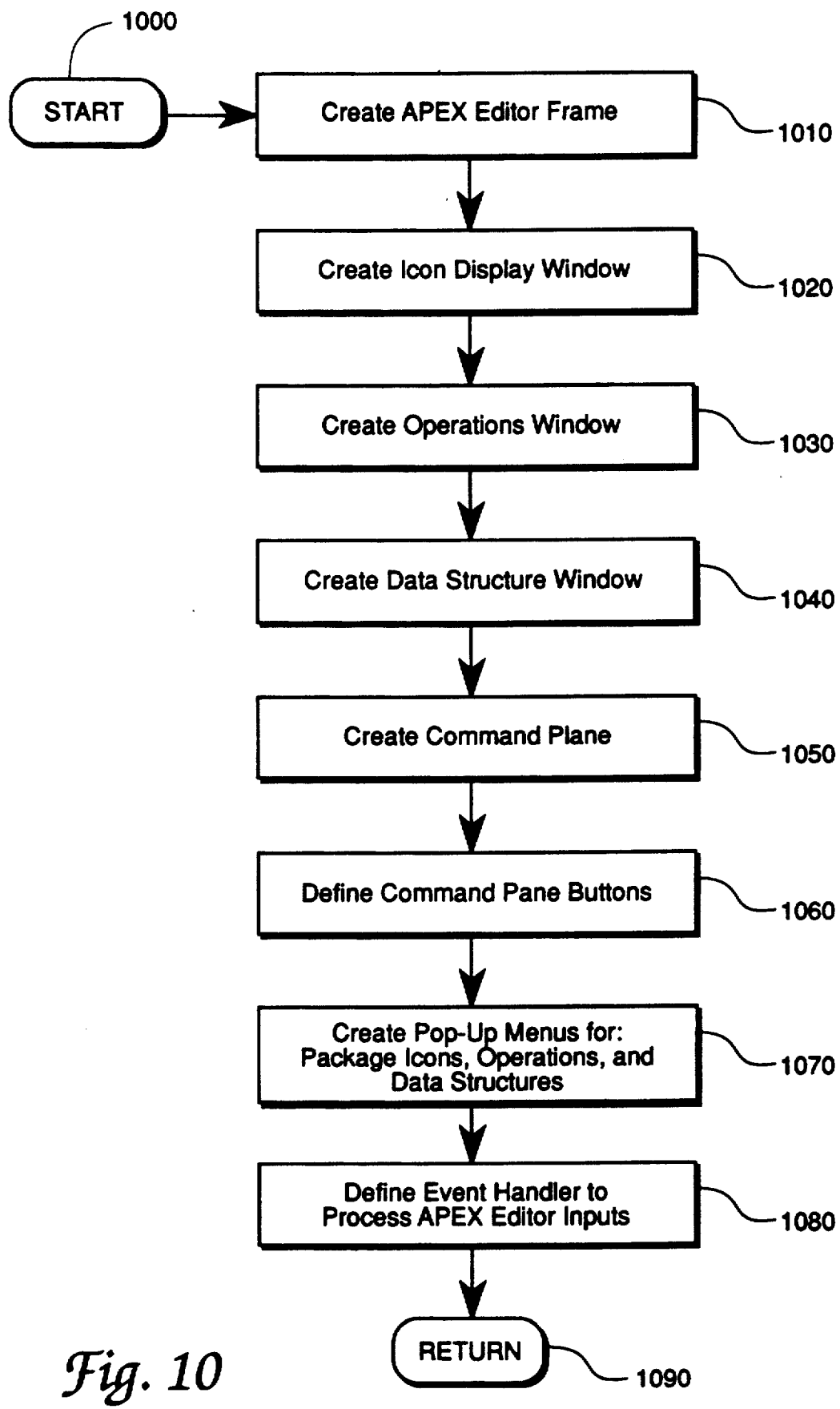
FIGS. 10-14 are flow charts relating to the APEX editor.

FIG. 10 illustrates the steps involved in creating each of the three editors (APEX editor, REM-Net editor, and Data Structure editor) which compose APEX. Although only the APEX editor itself (block 204) is described in this flowchart, the same basic steps apply to Setup REM-Net Editor Windows (block 206, part of program file petri-net.c) and Setup Data Structure Editor Windows (block 208, part of program file Dse.c)).

As shown in FIG. 10 (which is a flow chart for part of the Apex.C program file in the Appendix), the setup of editor windows begins at a start block 1000 to a block 1010 to create an editor frame. The next block three blocks executed in sequence are used to create windows for the icon display at block 1020, operations at block 1030 and data structure at block 1040. Block 1050 is used to create a command pane and block 1060 to define command pane buttons. The next block 1070 creates Pop-Up menus for package icons, operations, and data structures. Block 1080 is used to define an event handler to process editor inputs. The program then returns via block 1090.

The SunView Windows System (part of the Sun operating System) provides the system calls that allow the applications programmer to create and customize the display. Pop-up menus can be defined using the same mechanism. An event handler is created to process inputs (received from a mouse or keyboard) to each editor. The event handler is only executed when an input is received; inputs are processed according to the instruction in the event handler. Note that all frames, windows, menus, buttons, and event handlers are created using calls to SunView windows library provided with the Sun 3/110 workstation.

2. APEX Editor Input Handler

Description: As shown in FIG. 2, after all the editors have been setup, control of the program defaults to the individual event handlers for each editor. At this point, the program is in a wait mode; this means it does no processing unless an input is received. The event handler used by the program is governed by the position of the mouse. For example, if the mouse is currently over the APEX editor, then the input is vectored to the APEX editor's event handler 220. The flow chart of FIG. 11 (which represents part of file Apex.c in the APEX code listing of the Appendix) shows the steps performed by the APEX editor's event handler in order to process input to that editor. The event handlers for the other two editors have the same basic structure, even though they process input differently. The event handler for each editor controls when other important functions (such as object creation, selection, and edit) are executed.

Figure 11:
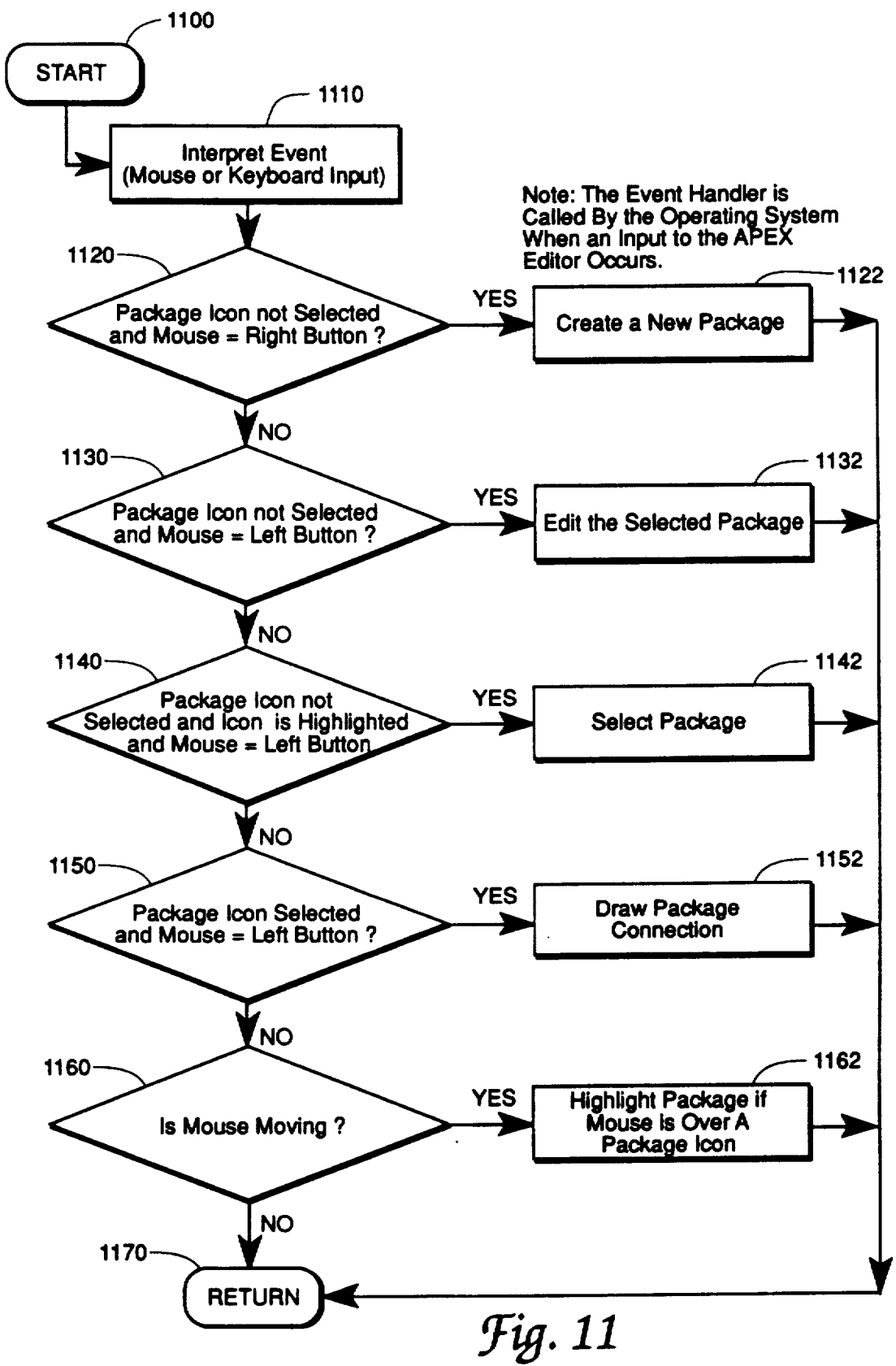

In FIG. 11, block 1100 shows the start of the operation. At block 1110, there is an interpretation of the event in response to a mouse of keyboard input. Note that the Event Handler is called by the operating system when an input to the APEX editor occurs.

At a decision block 1120 there is test whether a package icon is not selected and the right button of the mouse is pressed. If "yes", the operation goes to block 1122 to create a new package.

If the decision at block 1120 is "no", then at decision block 1130 there is test whether a package icon is selected and the left button of the mouse is pressed. If "yes", the operation goes to block 1132 to edit the selected package.

If the decision at block 1130 is "no", then at decision block 1140 there is test whether a package icon is not selected and the icon is highlighted and the left button of the mouse is pressed. If "yes", the operation goes to block 1142 to select a package.

If the decision at block 1150 is "no", then at decision block 1160 there is test whether the mouse is moving. If "yes", the operation goes to block 1152 to highlight a package if the mouse cursor is over a package icon.

If the decision at block 1160 is "no", then the operation returns via block 1170. Output from each of the blocks 1122, 1132, 1142, 1152 and 1162 is also via the return block 1170.

3. Create an APEX Object

Figure 12:
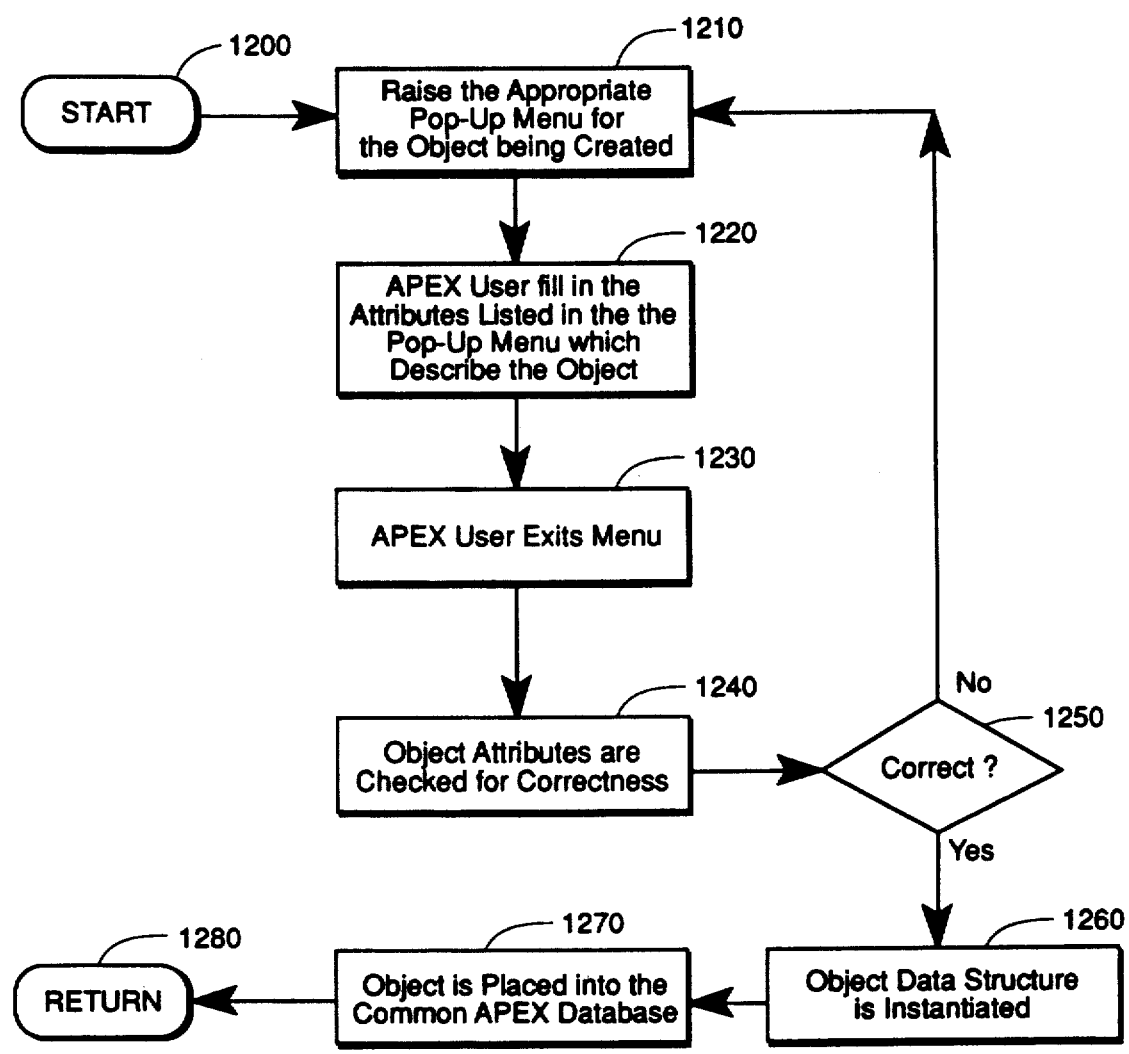

The flow chart of FIG. 12 (which represents part of file Apex.c in the APEX code listing of the Appendix) describes the basic process used to create an APEX object. WOULD BLOCK 1122 OF FIG. 11 BE AN EXAMPLE OF ENTRANCE TO FIG. 12! Although there can be many different APEX objects (packages, operations, data types, states, slots, events, connections, etc.) the process used for their creation is similar for each. The two main differences for each type are: 1) where in the common database (see FIG. 3) they reside, and 2) what attributes are specific to each APEX object. The key attributes of each APEX object are usually determined by the user's input to the Pop-Up menu for that object. A separate Pop-Up menu exists for each APEX object (defined during the setup of each editor). The Pop-Up menu, once defined, can be raised via a call to Sun View. Upon exiting a Pop-Up menu, a post processing routine is called to check the contents of the Pop-Up menu for insertion into the data structure used in the common database. If acceptable, the APEX object is inserted into the common database.

In FIG. 12, block 1200 shows the start of the operation. Block 1210 represents the operation to raise the appropriate Pop-Up menu for the object being created. At block 1220, the program allows the APEX user to fill in the attributes listed in the Pop-Up menu which describe the object. At block 1230, the APEX user exits the menu. At block 1240 the object attributes re checked for correctness, with a decision block 1250. If not correct, operation returns to block 1210 to again raise the Pop-Up menu. If the attributes are correct at block 1250, operation goes to block 1260, where the object's data structure is instantiated. Operation then goes to block 1270, where the object is placed into the common APEX database. The program then goes to block 1280 to return.

4. Select an APEX Object

Figure 13:
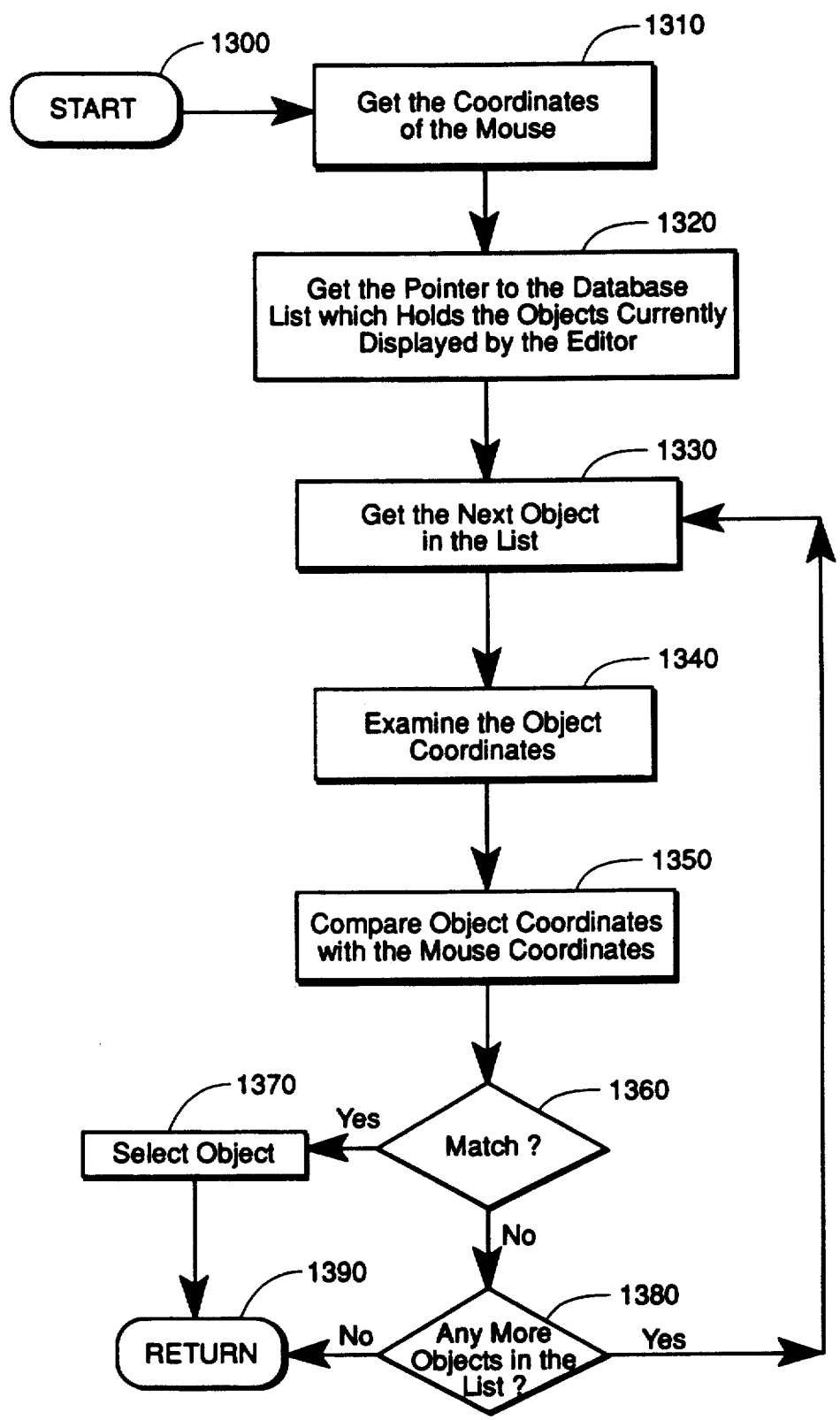

The flow chart of FIG. 13 (which represents part of file Apex.c in the APEX code listing of the Appendix) describes the basic process used to select an APEX object. Block 1142 of FIG. 11 is an example on an entrance to FIG. 13. Though each editor has its own methodology, the basic process for selecting an APEX object is consistent for all editors. Selection of an APEX object is based on input from the mouse. The position of the mouse cursor on the screen determines what object is selected. Once the position of the mouse cursor is known, a search of the common database is performed for the appropriate APEX object whose position matches the mouse cursor's position. The appropriate object is determined by several factors; these being:

a. Editor currently under the mouse cursor
b. Window currently under the mouse cursor
c. Coordinates of the mouse cursor in the window The search continues until a match is found, or the database has been exhausted.

In FIG. 13, block 1300 shows the start of the operation. Block 1310 represents the operation to get the coordinates of the mouse cursor. Block 1320 represents the operation to get the pointer to the database list which holds the object currently displayed by the editor. Block 1310 represents the operation to get the next object in the list. At block 1240 the object coordinates are examined. At block 1350, there is a comparison of the object coordinates with the mouse coordinates. If at decision block 1360 it is found that the coordinates match, the operation goes to block 1370 to select the object, and then to block 1390 for return. If the at block 1360, it is found that the coordinates do not match, a decision is made at block 1380 to determine if there are any more objects in the list, and if "yes" the operation goes back to block 1330, and if "no" goes to block 1390 for return.

5. Edit an APEX Object

Figure 14:
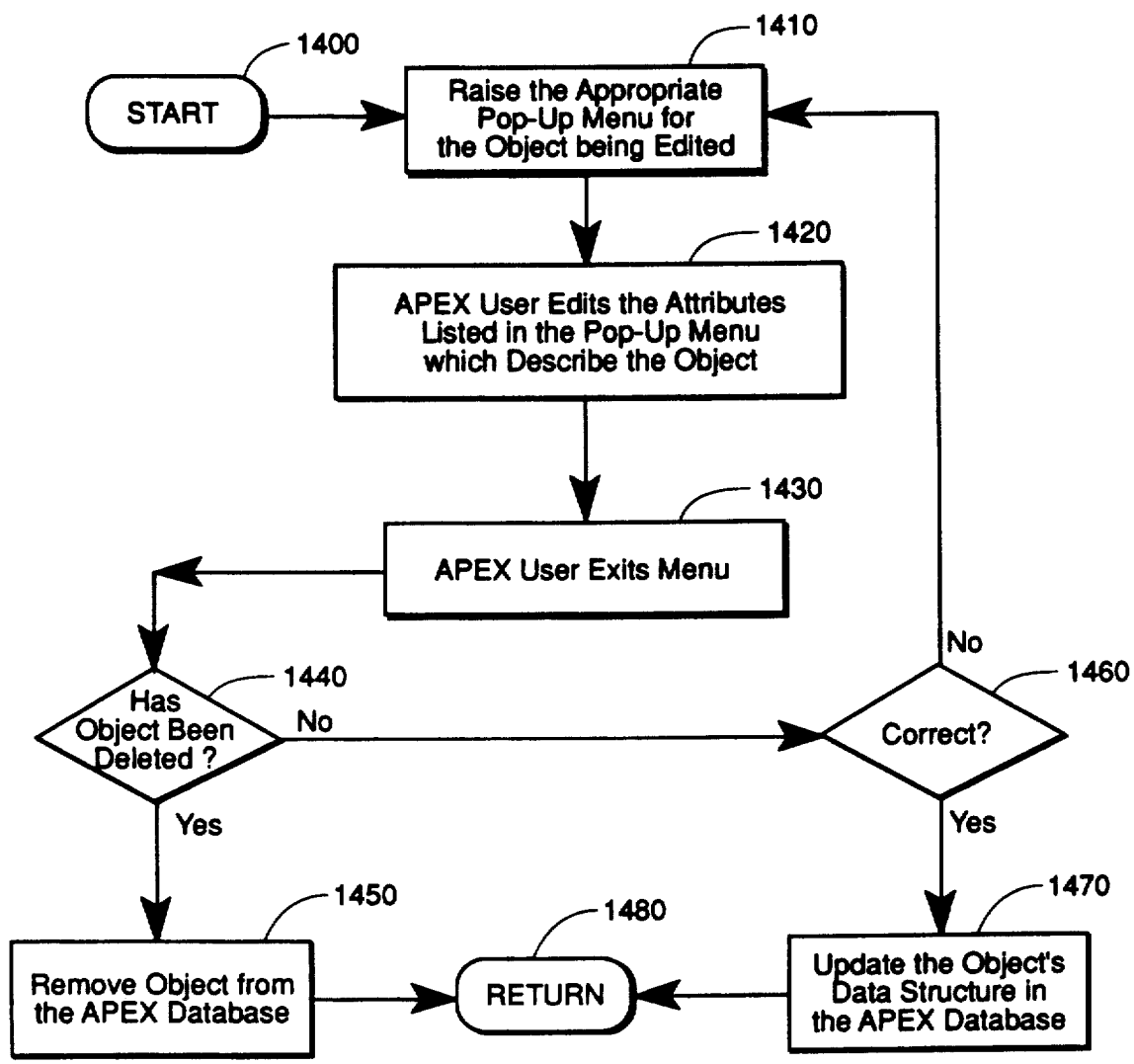

The flow chart of FIG. 14 (which represents part of file Apex.c in the APEX code listing of the Appendix) describes the basic process used to edit an APEX object. Block 1132 of FIG. 11 is an example on an entrance to FIG. 14. Though each editor has its own methodology, the basic process for editing an APEX object is consistent for all editors, for all editors, an APEX object must be created and selected before it can be edited. The Pop-Up menu used to edit each APEX object is usually the same one used to initially create the object and is handled in the same manner. Upon exiting the menu, if the user has chosen to delete the object, the object's data structure is purged from the common database. The process of purging the database can cause changes to propagate to other editors (thus enforcing consistency between editors). If the object is not deleted, the new attributes of the object are updated in the common database.

In FIG. 14, block 1400 shows the start of the operation. Block 1410 represents the operation to raise the appropriate Pop-Up menu for the object being edited. Block 1420 represents the operation wherein the APEX user edits the attributes listed in the Pop-Up menu which describe the object. At block 1430 the APEX user exits the menu. At block 1440 there is a test as to whether the object has been deleted. If "yes", then the operation goes to block 1450 to remove the object from the APEX database, and then return via block 1480. If the decision at block 1440 is "no", then a decision is made at block 1460 as to whether the object description is correct, and if not the program returns to block 1410. If correct, then from block 1460 the operation goes to block 1470 to update the object's data structure in the APEX database and to return via block 1480.

6. Generate Ada Code

File Apexada.c holds the routines to generate the Ada code for the Ada package specifications defined in the APEX editor. The routines of the file Apexada.c generate Ada code for the following items, as shown in flow charts designated as slides 1-4 in FIGS. 15-18;

Generation of code for Ada packages.
Generation of code for Ada data structures.
Generation of code for Ada variables.
Generation of code for Ada operations.

File Petri-ada.c holds the routines to generate Ada subprogram bodies corresponding to the REM-Net editor representation. The routines in this file perform the following functions, as shown in flow charts designated as slides 5-10 in FIGS. 19-25:

Generate the Ada code for states.
Generate the Ada code for events.
Generate the Ada code for transitions.
Order third-editor icons to reflect the logical ordering of the subprogram.
sort transitions (based on the icon ordering) to reflect the level of loop nesting.

Note that Ada code is actually generated by use of the printf function in the C language, which is used to provide output to a file for saving the results. The printf function provides a template which is filled by attributes, etc. determined by the program operation.

a. Generate Ada Code—Slide 1

Figure 15:
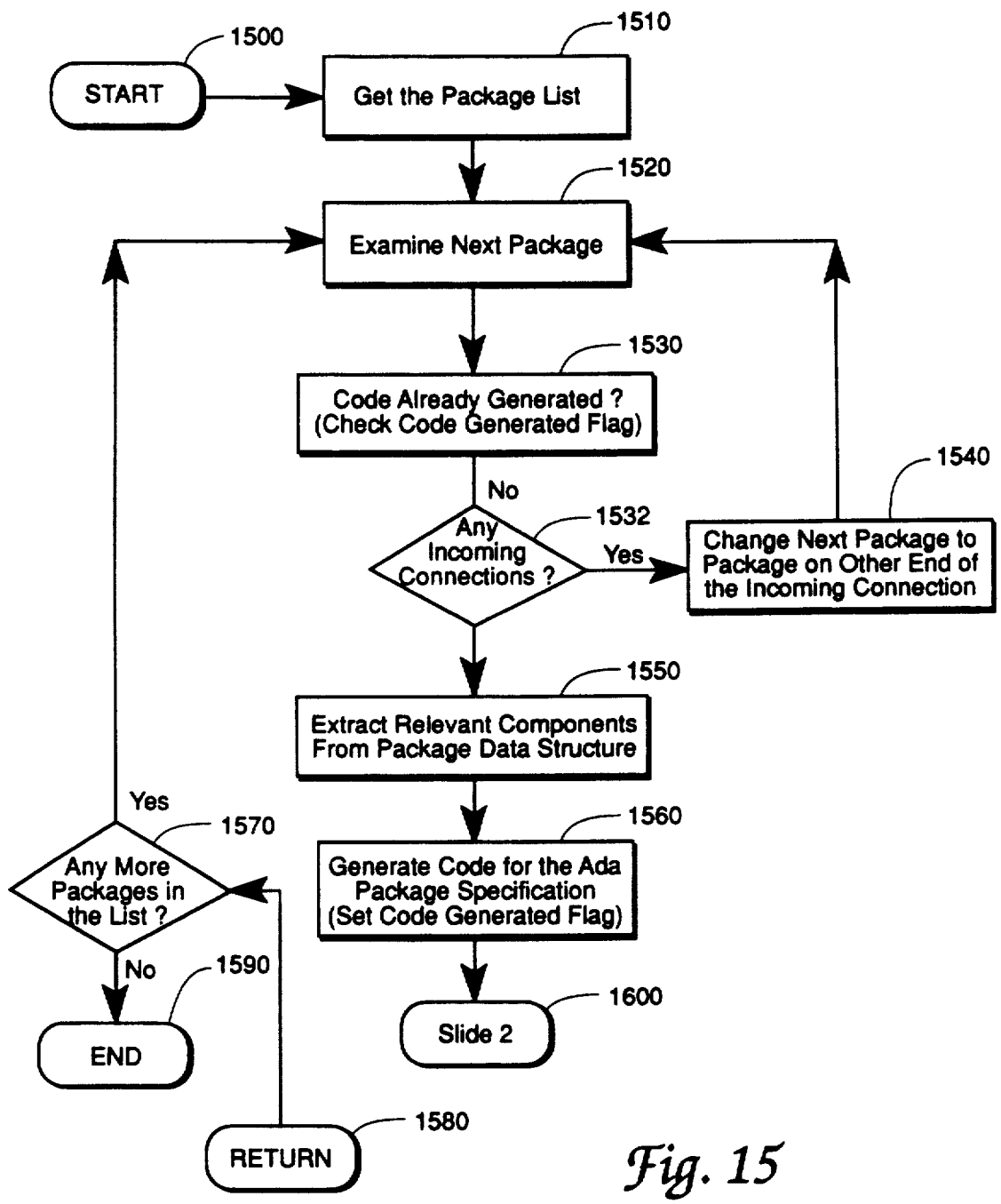
FIGS. 15-25 are flow charts showing routines to generate ADA code.

FIG. 15 is the first flow chart in the discussion of the Ada code generation algorithm. APEX generates Ada code by traversing the common data base in a top-down fashion and extracting the relevant information needed to produce the Ada code from each object in the database (see FIG. 3).

The first step in generating Ada code is to generate the code for each package in the database. In response to selection by the User of the command 513 in FIG. 5, the program goes to the file Apexada.c to the start block 1500 in FIG. 15. The operation first goes to block 1510 to get the package list, and then to block 1520 to examine the next package. A flag is checked at block 1530 to determine if code has already been generated for the package. Because of the structured nature of Ada, the package whose Ada code is generated first is the one which is 'withed' by other packages. In APEX, this is determined by the incoming connections to a package; a connection denotes a 'with' relationship between packages. As a result, a package which is used by other packages (via the 'with' statement) has its code generated first. Therefor at block 1532 a check is made as to whether there are any incoming connections, and if so the operation goes to block 1540 to change the next package to the package on the other end of the incoming connection, and then go back to block 1520. If at block 1532 it is determined that there are no incoming connections, the operation goes to block 1550 to extract relevant components from the package data structure. Block 1570 represents the operation to generate code for the Ada package specification. Also at block 1570, a flag is set for each package after the code for the package has been generated; this prevents code being generated multiple times for the same package. The Ada code for the package specification is now ready to be generated, which commences with slide 2 via block 1600 to FIG. 16.

At various places in FIGS. 16–24 there are return blocks 1580, which takes the operation to a decision block 1570 to determine if there are any more packages in the list, and if so the operation goes back to block 1520 to examine the next package. After the last package in the list operation goes from block 1570 to the end 1590. The program then reverts to the editor screen of FIG. 4, for further selection by the User.

b. Generate Ada Code—Slide 2

As indicated in FIG. 3a, each package has several types of APEX object lists associated with it (operation list, global variable list, and data structure list). The APEX objects in each of these lists are used in order too generate the Ada package specification.

Figure 16:
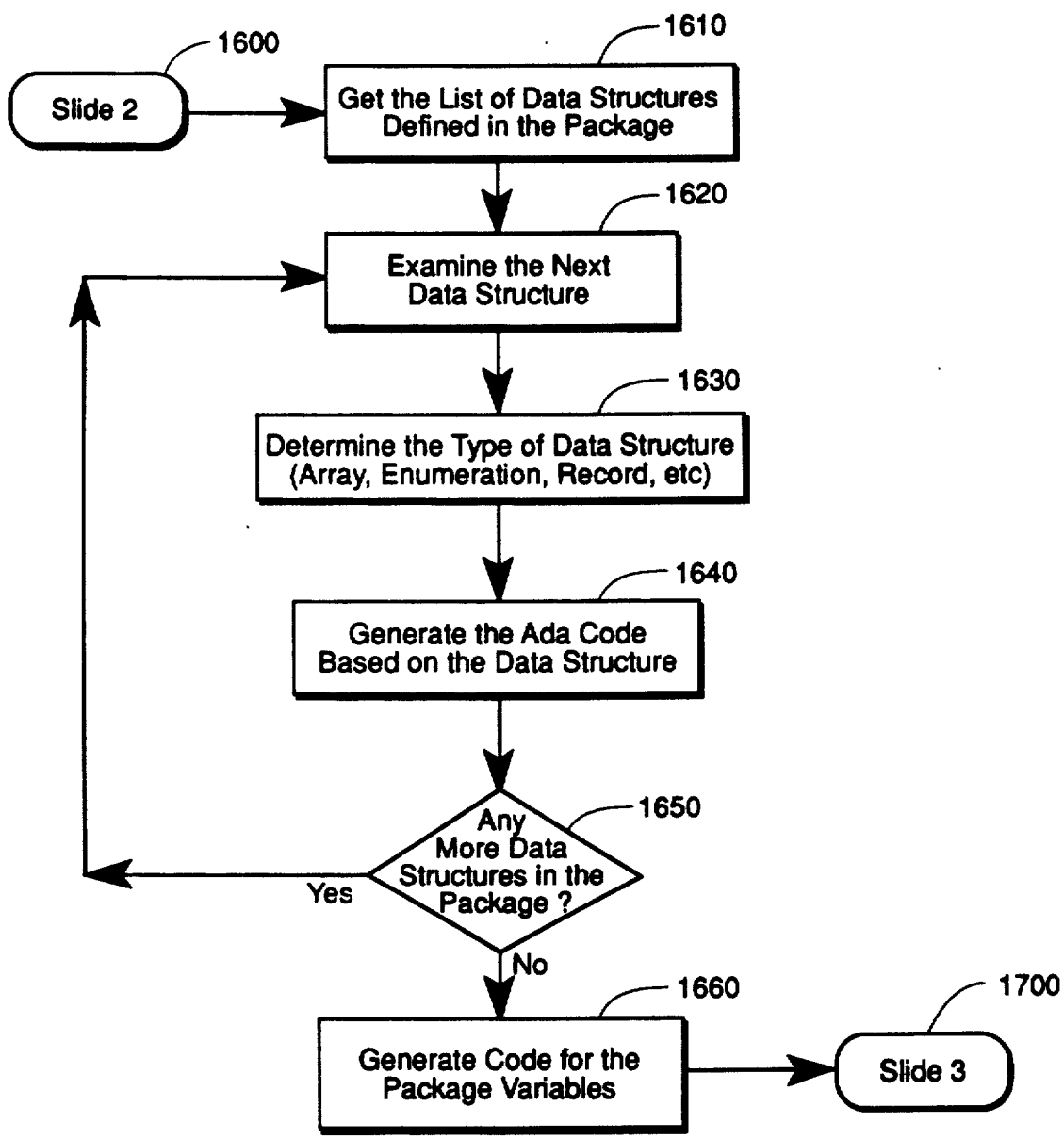

In slide 2, FIG. 16, the data structure list is traversed. Each of the APEX data structure objects are examined. Based on the type of Ada data structure object, a template is filled in using the attributes of the APEX data structure object; these attributes are listed in section V. Once the template has been filled in, the Ada code corresponding to the data structure is generated. Since most of the work has been accomplished already, the actual generation of the Ada code is performed by a single statement ('printf'); as such, it has only been summarized in the flowchart.

From block 1600, operation goes to block 1610 to get the list of data structures defined in the package, and then to block 1620 to examine the next data structure. The next block 1630 is to determine the type of data structure (array, enumeration, record, etc), followed by block 1640 to generate the Ada code based on the data structure. At block there is a decision as to whether there are any more data structures in the package, and if so the operation goes back to block 1620. Otherwise operation goes to block 1660 to generate code for the package variables. Now go via block 1700 to slide 3, FIG. 17.

c. Generate Ada Code—Slide 3

Figure 17:
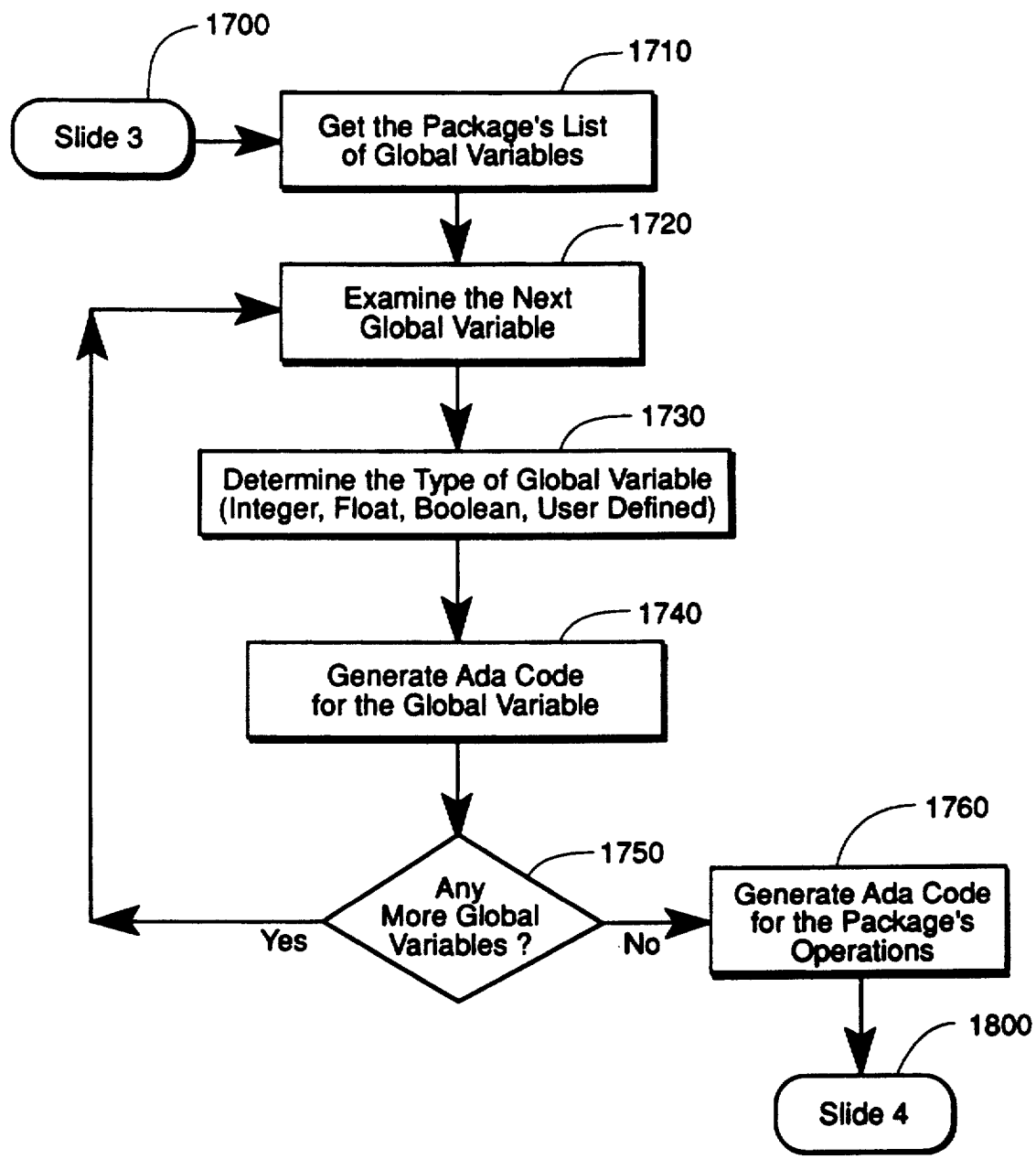

In slide 3, FIG. 17, the global variable list is traversed. Each of the APEX global variable objects are examined. Based on the type of Ada data structure, a template is filled in using the attributes of the APEX variable object. Once the template has been filled in, the Ada code corresponding to the global variables is generated.

From block 1700, operation goes to block 1710 to get the package's list of global variables, and then to block 1720 to examine the next global variable. The next block 1730 is to determine the type of global variable (integer, float, boolean, user defined), followed by block 1740 to generate the Ada code for global variable. At block 1750 there is a decision as to whether there are any more global variables, and if so the operation goes back to block 1720. Otherwise operation goes to block 1760 to generate Ada code for the package's operations. Now go via block 1800 to slide 4, FIG. 18.

d. Generate Ada Code—Slide 4

Figure 18:
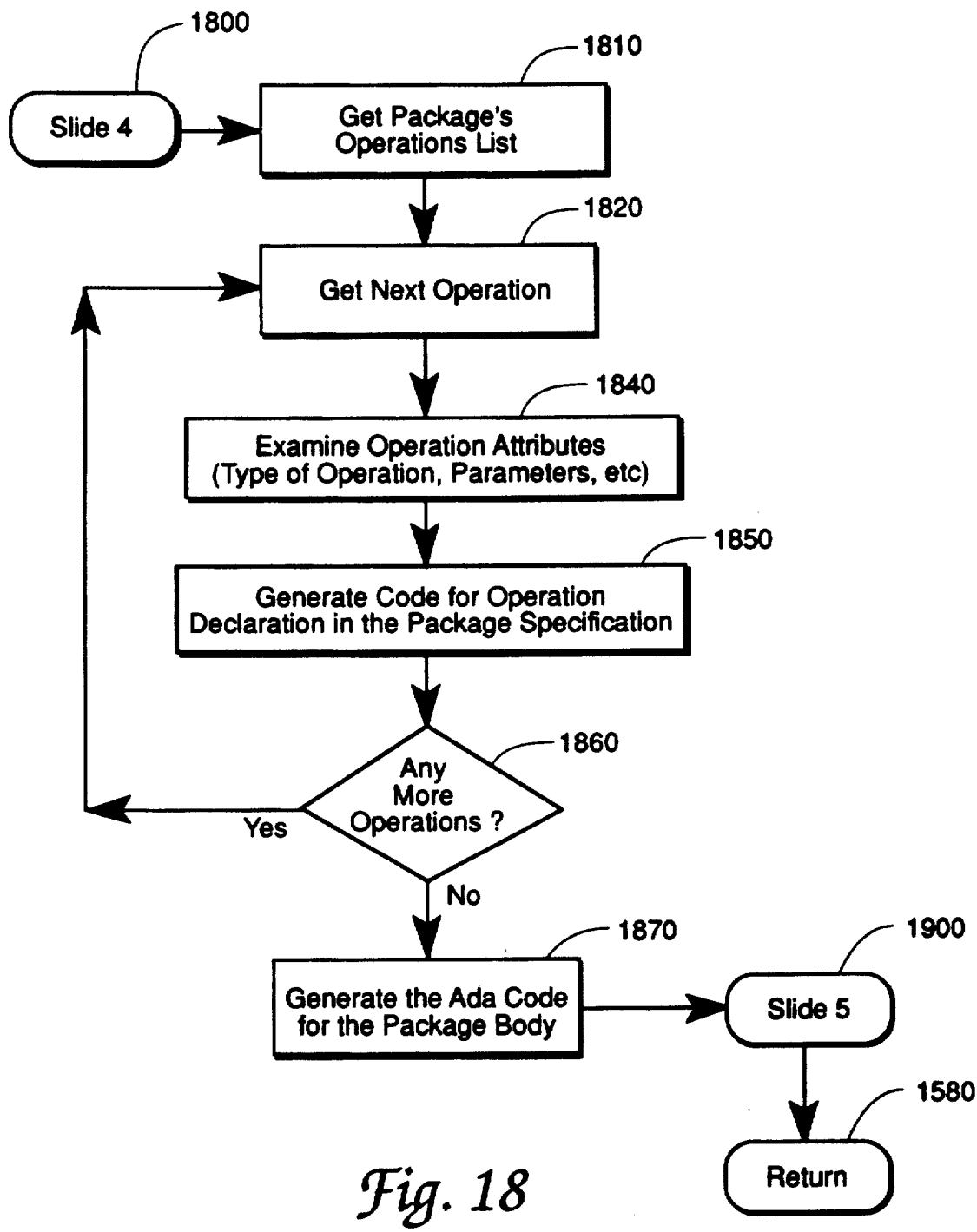

In slide 4, FIG. 18, the operation list is traversed. Each of the APEX operation objects are examined. Based on the type of operation, a template is filled in using the attributes of the APEX operations object. Once the template has been filled in, the Ada declaration for the operation is generated. In the case of the operation object, code is generated twice, once in the package specification (as a declaration), and in the package body (where the operation itself is decomposed as a subprogram). At this point, the Ada code generation for the package is complete.

From block 1800, operation goes to block 1810 to get the package operations list, and then to block 1820 get the next operation. Block 1840 represents the operation to examine the operation attributes (type of operation, parameters, etc), followed by block 1850 to generate the Ada code for operation declaration in the package specification. At block 1860 there is a decision as to whether there are any more operations, and if so the operation goes back to block 1820. Otherwise operation goes to block 1870 to generate Ada code for the package body. Now go via block 1900 to slide 5, FIG. 19.

Figure 19:
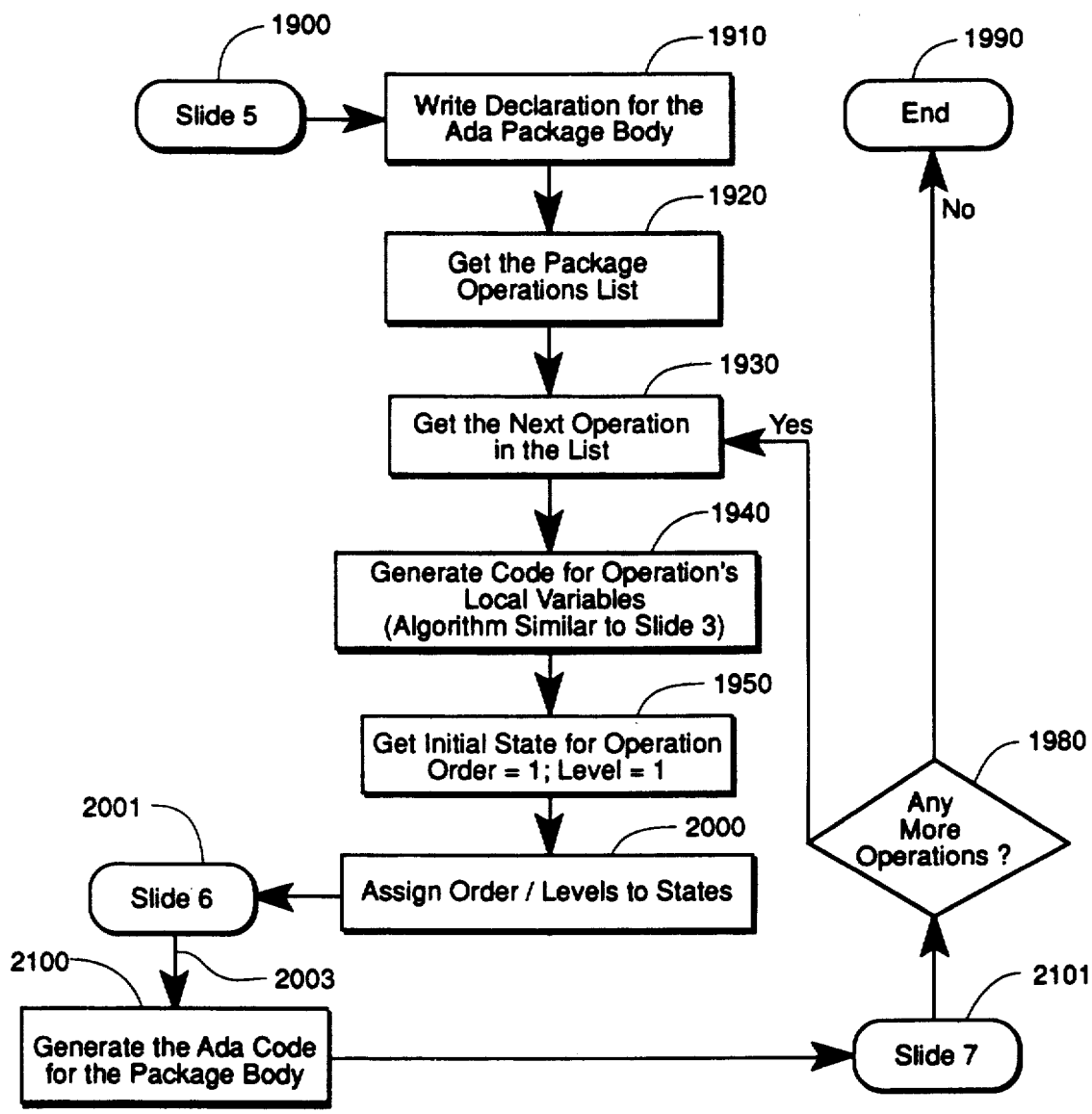

Slide 5 in FIG. 19 ends with a return to block 1580 and back to FIG. 15. Note that upon return, the Ada code generation for a package is complete.

e. Generate Ada Code—Slide 5

In slide 5, FIG. 19, the generation of the Ada code for the package body commences. The charts of FIGS. 19-25 comprise the file routine Petri-ada.c. From the start block 1900, to program goes to block 1910 to write the declaration for the Ada package body. At the next block 1920, the package operations list is obtained from the current package. This list is then traversed for each APEX operations object in the list, starting with block 1930 to get the next operation in the list. The structure of each APEX operations object can be seen in FIG. 3b. The program goes to block 1940 to generate code for the operation's local variables (an algorithm similar to that of slide 3 in FIG. 17). For each operations object, the header code for the subprogram is generated and the local variables are also generated. At the next block 1950, the initial state of the operation is then selected (order=1; level=1). The level of the state designates the level of nesting within the subprogram at which the state occurs. The order of the state designates the order within a give level of nesting at which the state occurs. A recursive routine represented as block 2000 (slide 6 of FIG. 20) is then called via block 2001 in order to assign an order/level to each state associated with the APEX operations object. Once this has been accomplished, the Ada code is generated by a routine represented as block 2100 entered via block 2101 for the remainder of the subprogram body (slide 7). This is accomplished for all operations in the package, with a decision block 1980 entered from block 2100 to go back to block 1930 as long as there are more operations. When there are no more operations, the routine ends at block 1990, which is the exit from block 1900 in FIG. 18.

f. Generate Ada Code—Slide 6

Figure 20:
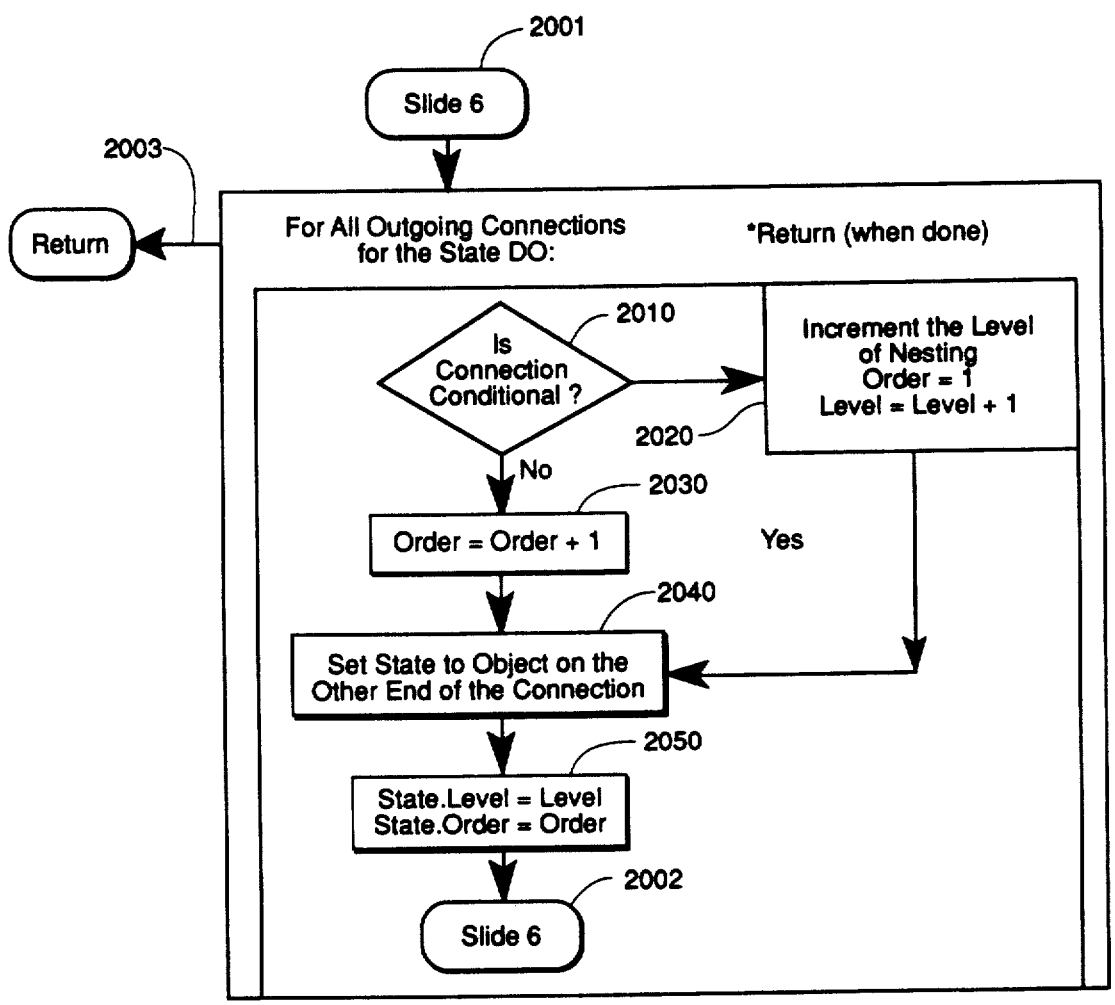

The recursive routine depicted in slide 6, FIG. 20, entered via block 2001, is passed a state; this routine processes the state it is passed. The first time it is called, it is passed the initial state in the operation; after this, the state it gets passed is the state currently set before slide 6 is called again. This recursive algorithm is an elegant way of ordering the states which make up an APEX operation.

The purpose of ordering states is to determine 1) the levels of nesting employed in a given APEX operation (or subprogram) and 2) determines the order of a state which occurs for a given nesting level. The first block 2010 makes a decision as to whether there is a conditional connection. At block 2020, when a conditional connection (representing an IF statement) is encountered; the level of nesting is incremented and the first state within a new nesting level is given an order of 1. If the connection tested at block 2010 is not conditional, the operation goes to block 2030 to increment the order by one. From either block 2020 or block 2030 the program goes to block 2040 to set the state to the object on the other end of the connection. The next block 2050 set the state.level equal to level, and the state.order equal to order. The recursive operation causes the program to go via the block 2002 back to the start block 2001 for the slide 6 to process the next state. The algorithm concludes when all states have been assigned an order and a nesting level, and the exit is via line 2003 back to slide 5 of FIG. 19 into block 2100.

g. Generate Ada Code—Slide 7

Figure 21:
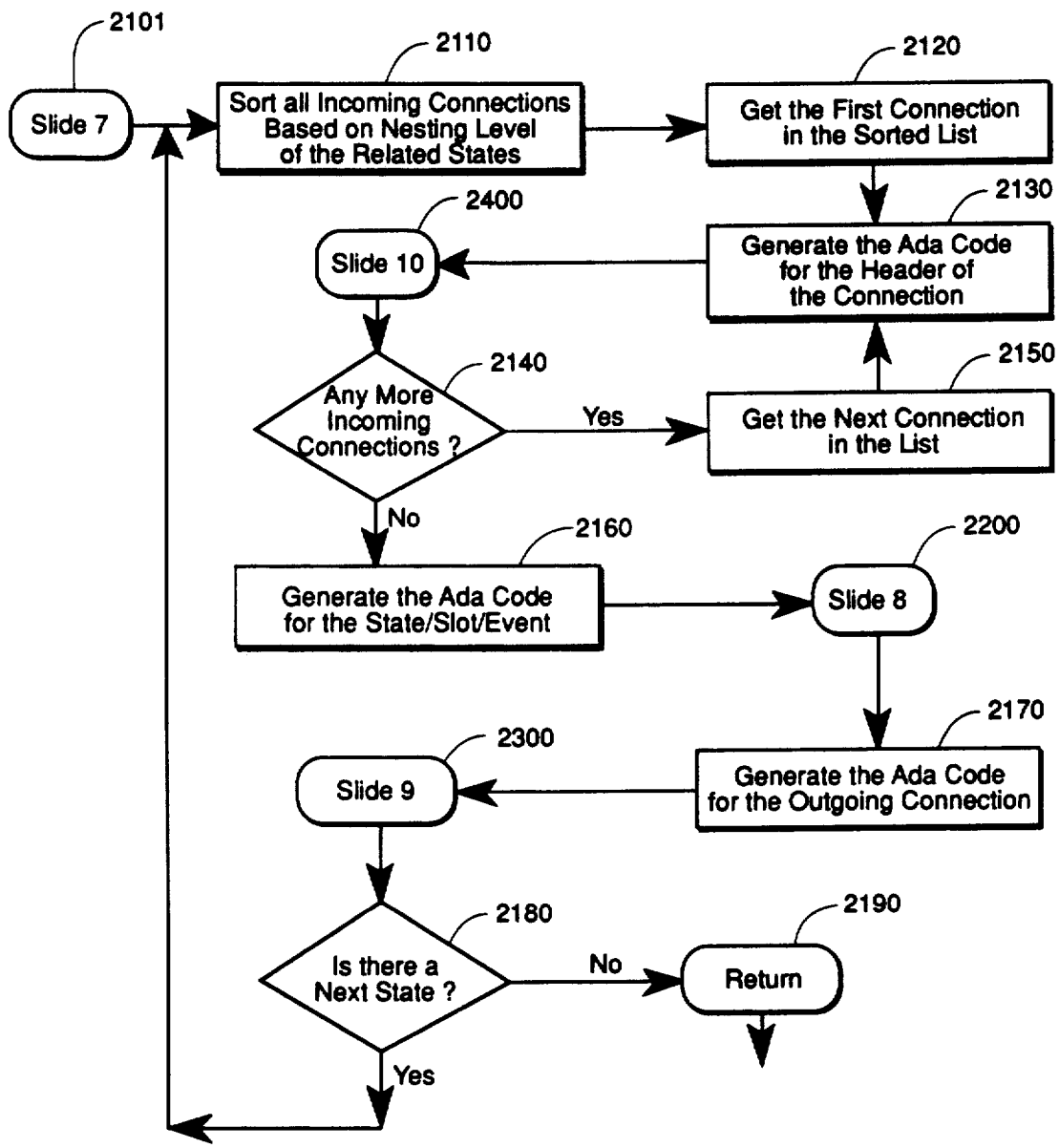

The routine shown in FIG. 21, which corresponds to blocks 2100 and 2101 of FIG. 19, handles the actual generation of Ada code for the subprogram described by the APEX operation. The first state passed to slide 7 is the initial state (order=1, level=1). In the REM-Net editor, all states are connected to each other by connections (also called transitions). Since each transition joints two states the connection to one state is considered incoming, while the connection to the other state is considered outgoing. All incoming connections to the state are examined and sorted at block 2110. Connections are sorted with the highest connection value appearing first, to the lowest connection value appearing last; the connection value is the basis for the sorting. The connection's value is derived the following algorithm:

--- state1 = connection.from_state
state2 = connection.to_state
if (state1.level = state2.level)
{
    connection.value = state2.order − state1.order
}

---

The connection with the highest value represents the outermost loop within which the state appears (since it includes states with the greatest range in order).

Each incoming connection, in turn, is processed. Block 2020 is used to get the first connection in the sorted list. At block 2030, the header code for the loop is generated based on the type of loop being modeled by the connection. The type of loops available is discussed in part A of section IV (under transitions; NOTE: Transitions and Connections means the same thing). The procedure for the generation of the Ada code for the incoming connection is described in slide 10, block 2400. Upon the return from slide 10, there is a check at block 2140 as to whether there are any more incoming connections, and if so the operation goes to block 2150 to get the next connection in the list, and then go back to block 2130.

Once the code for all incoming connections has been generated, the program goes from the decision block 2140 to block 2160, where the Ada code for the state itself is generated; this procedure being described in slide 8, block 2200.

Next at block 2170, the Ada code is generated for all outgoing connections which occur for the state in question. This procedure is described in slide 9, block 2300.

Once all code has been generated for a given state (including incoming and outgoing transitions), the next state in the list of states is processed. After block 2300, there is a decision block 2180 to check if there is a next state, and if so the program goes back to block 2110. After the last state is processed, the program returns via block 2190 to block 2101 in FIG. 19.

h. Generate Ada Code—Slide 8

Figure 22:
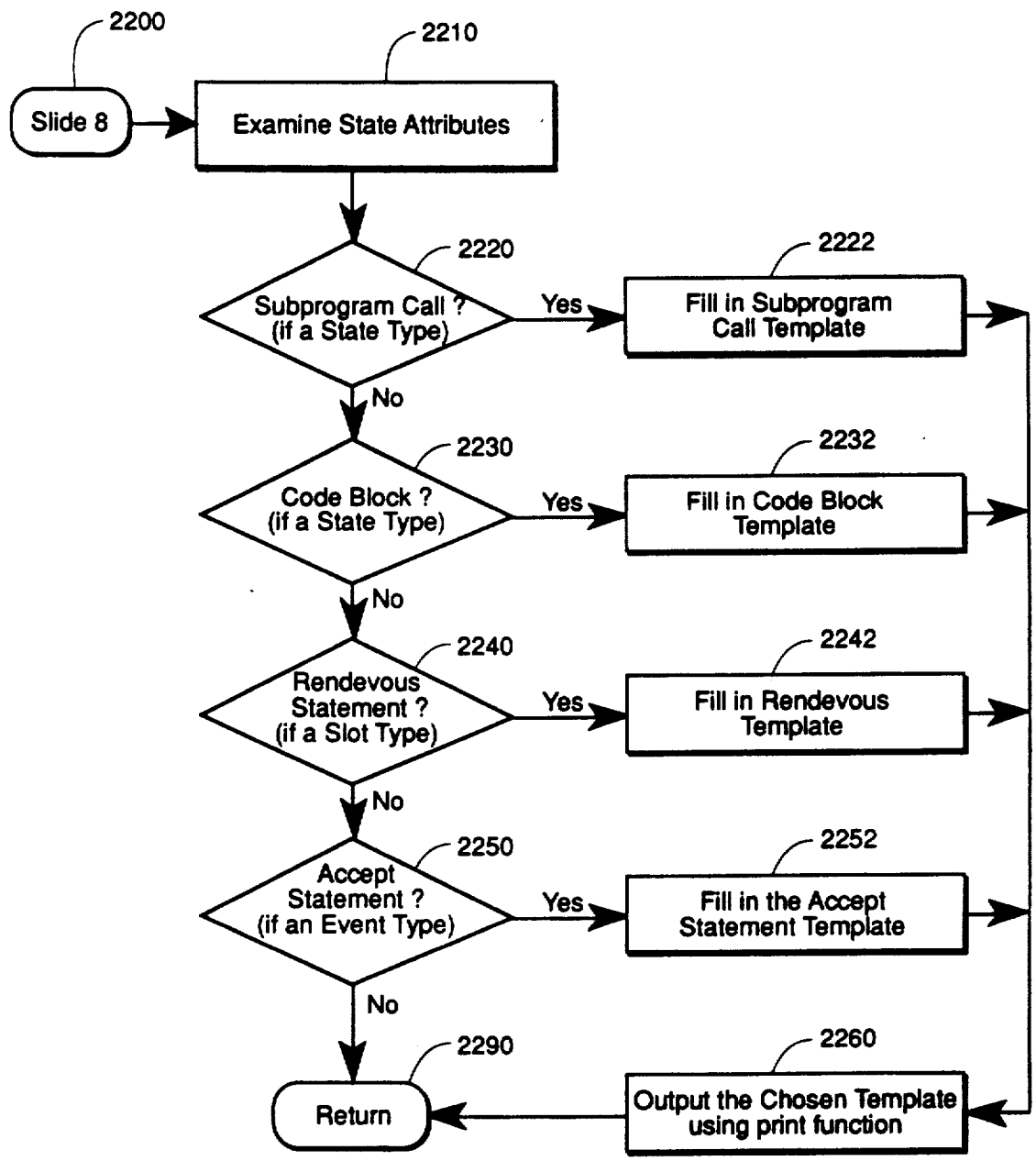

This routine shown in FIG. 22 is quite simple. From the start block 2200, it goes to block 2210, where it examines the attribute of the state passed to it in slide 7. Based on the type of Ada statement the state represents, the appropriate statement template is filled out and the Ada code is output. An APEX state can have the following types:

1. State: represents a subprogram (function, procedure) call or a code/comment block
2. Event: represents an accept statement
3. Slot: represents a rendezvous statement From block 2210, there are a series of decision blocks 2220, 2230, 2240, 2250, and if all decisions are no, then to the return block 2290. If a "yes" decision at block 2220 indicates a subprogram call (if a state type) the program goes to block 2222 to fill in a subprogram template. If a "yes" decision at block 2230 indicates a code block (if a state type) the program goes to block 2232 to fill in a code block template. If a "yes" decision at block 2240 indicates a rendezvous statement (if a slot type) the program goes to block 2242 to fill in a rendezvous template. If a "yes" decision at block 2250 indicates an accept statement (if an event type) the program goes to block 2252 to in fill the accept statement template. From any of the blocks 2222, 2232, 2242 or 2252, the operation goes to block 2260 to output the chosen template, and return via block 2290 to block 2200 in FIG. 21.

i. Generate Ada Code—Slide 9

Figure 23:
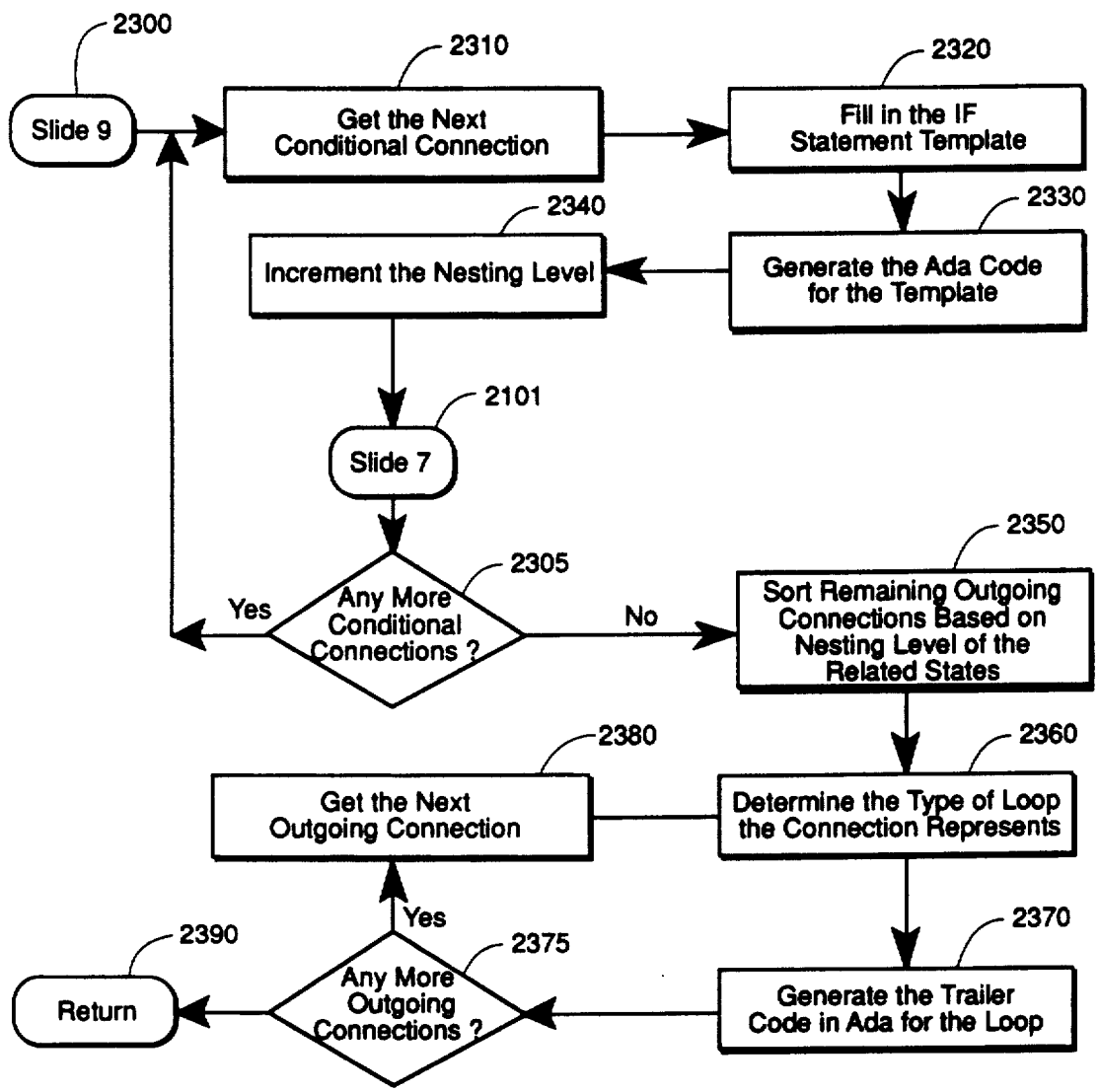

Slide 9 is shown in FIG. 23. Ada code for outgoing connections (or transitions) can include the following:

1. Trailer code for loops
2. Conditional connections (IF statements)

First, a check is made for any conditional connections. If they are present, the header is generated for the condition being modeled. After the start block 2300, block 2310 is used to get the next conditional connection, block 2320 is used to fill in the IF statement template, and block 2330 is used to generate the Ada code for the template. Once the header for the condition statement is generated, the nesting level is incremented at block 2340, and slide 7 is called with the first state used in that nesting level. When all code has been generated for the new nesting level, control is returned to slide 9. At block 2305 a check is made for any more conditional connections, and if there are any the operation loops back to block 2310. After the last conditional connection is processed, the operation goes from block 2305 to block 2350.

Now all connections within the current nesting level are processed. These are handled in much the same way that the incoming connections are handled in slide 7, except that the sorting at block 2350 occurs in the reverse order (lowest connection value is first, highest connection is last). After sorting, each outgoing connection is processed in its turn. At block 2360, there is a determination of the type of loop the connection represents. In this routine, at block 2370, the trailer code (instead of the header code) for each loop represented by the connection is generated. At block 2375 there is a check for any more outgoing connections, and if there are any block 2380 is used to get the next one, and loop back to block 2360. This routine returns from block 2375 to block 2390 when all outgoing connections have been processed.

j. Generate Ada Code—Slide 10

Figure 24:
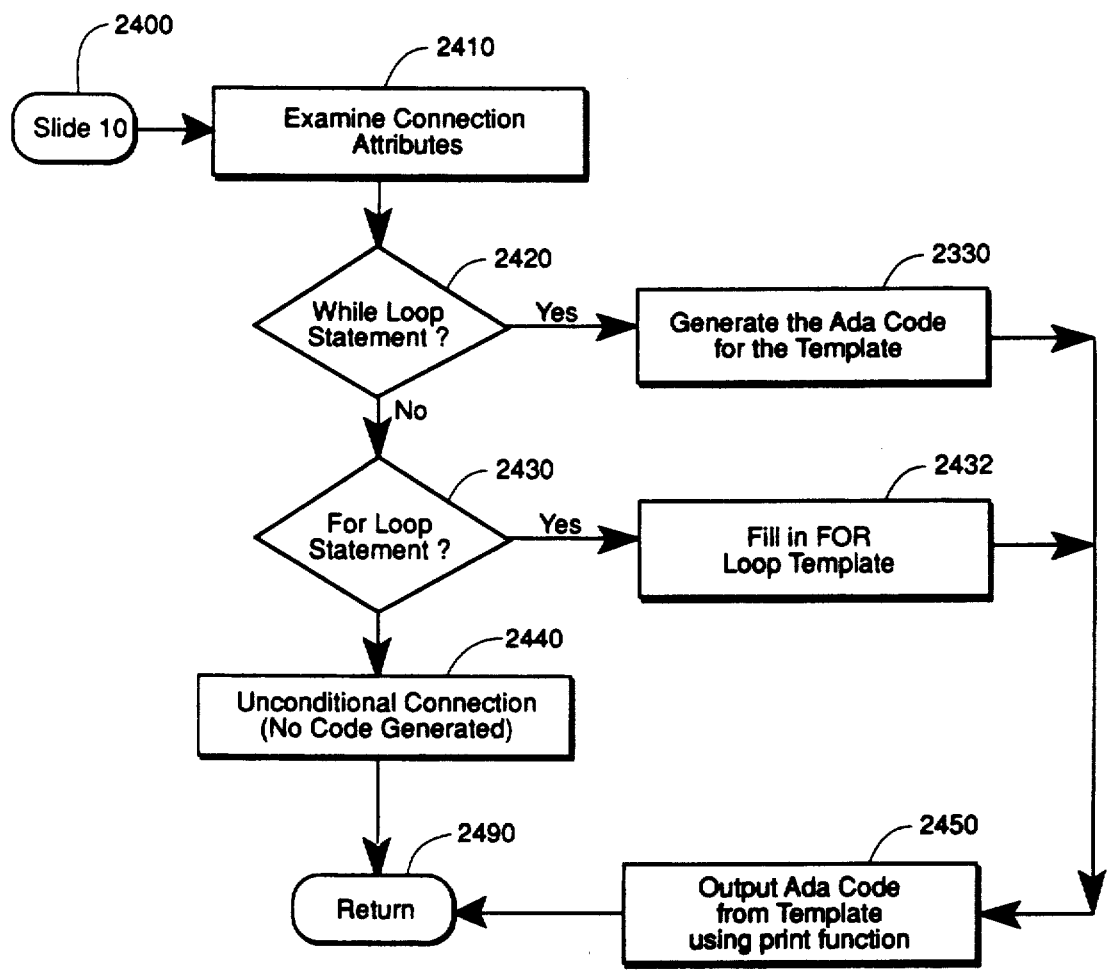

The routine shown in FIG. 24 generates the header code for a given incoming connection. When a connection comes into a state, it represents a loop which begins at that point in the operation. Thus the state into which the connection comes is the first state in the loop. Since the loop includes the state, it is necessary to generate the header code of the loop before the code for the state itself is generated. Conversely, the code associated with outgoing connection must be generated after the code for the state is generated (see slide 9).

So much for the theory. What this routine does is examine the type of incoming connection and generate the header code for the appropriate type of incoming connection. There are three (3) basic types of incoming connections:

1. For Loop
2. While Loop
3. Unconditional

Ada code is only generated if the incoming connection represents either a For or While loop; no code is generated if the connection represents an unconditional transition between states.

From the start block 2400, block 2410 is used to examine the connection attributes. Blocks 2420 and 2430 are decision blocks to check if the connection is a while loop or a for loop. If block 2420 determines that it is a while loop, block 2422 is used to fill in the while statement template, and if block 2430 determines that it is a for loop, block 2422 is used to fill in the for statement template, and from either block 2422 or block 2432, operation goes to clock 2450 to output the Ada code from the template. If the connection is neither a while loop or a for loop, operation goes from block 2430 to block 2440 for an unconditional connection, no code being generated. From block 2440 or 2450, there is a return via block 1490.

Figure 25:
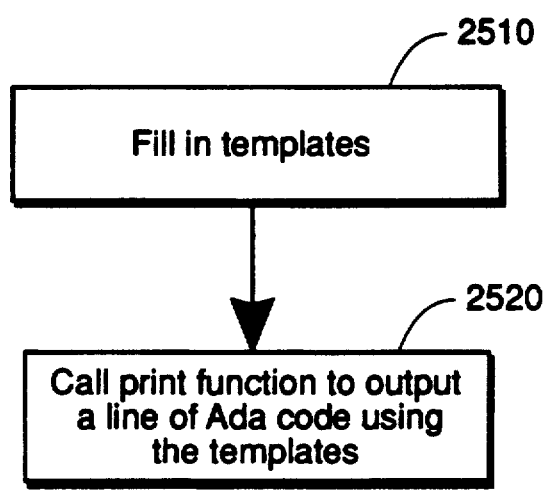

FIG. 25 is a flow chart illustrating in more detail the blocks 1560, 1640, 1660, 1740, 1760, 1850, 1870, 1940, 2100, 2130, 2160, 2170, 2330 and 2370 of FIGS. 15–23 to generate Ada code. Block 2510 shows filing in templates for generation of the selected code, and in block 2520 the print function is called to output a line of code using the templates. In like manner the blocks 2260 and 2450 in FIGS. 22 and 24 respectively show the output of the chosen template using the print function. An example of calling the print function, is the following line in the C language from the file Apexada.c, which is used as part of the code to generate the with clause for all incoming transitions.

```
printf("%spackage %s is  n",
    &bline[NOB-gindent],package→name);
```

The symbol %s indicates where a template string is inserted in the string between quotes. The addresses for the template strings follow the closing quote.

k. Templates

To further clarify the use of templates, note that the global declarations in the file Apexdef.c defines several data structures in which the reserved word "struct" of the C language is followed by a tag name preceeding a list of structure members. This provides a template for the structure without actually reserving provides a template for the structure without actually reserving any storage locations. (See Bronson and Manconi, "A First Book of C, Fundamentals of C Programming" 2nd edition, page 332, West Publishing Co. 1991.) (In some other languages such as PASCAL the structure is called a record, which may be defined as a type without reserving any storage locations, and the members of a record are called fields.) Actual storage for members of a structure is reserved when specific variable names are assigned by a statement starting with the word "struct" followed by the tag name for the type, and then a specific variable name for one structure. The structure may then be populated by assigning values to its members.

In the file Apexdef.c, a data structure "pck" describes a package defined in the APEX EDITOR, a data structure "op" describes an APEX operation (used in all editors), a data structure "ds" describes an APEX data structure, a data structure "conn" describes the transitions in the APEX editors, a data structure "pnconn" describes the transitions in the REM-net editor, a data structure "pstate" described a state in the REM-net editor, a data structure "pslot" describes a slot in the REM-net editor, and a data structure "pevent" describes an event in the REM-net editor.

In the file Apexada.c, the above data structures are used to assign actual variables of these structure types, and members are assigned actual values by the process of generating Ada code as shown in FIGS. 15-25. The values of the members are then used when executing the print function to output statements in Ada code.

III. APEX Editor

A. Explanation of Methodology

Although prior graphical Ada software design tools and methodologies provide methods of defining the top level declarations for an Ada program, there are some problems associated with the current generation of tools; which include:

Little support for subprogram specification.
No consistency between different views of the program.
Methodologies are too complex.
Too much extraneous information is required.

The APEX system was constructed as a platform for prototyping approaches to overcome these deficiencies. The APEX system consists of a top level editor (APEX Editor) and two peripheral editors (Data Structure, and REM-Net editors). These editors, when used together, provide the programmer with three different, yet consistent, views of his program. Each view is optimized for its specific purpose. This section will focus on the APEX editor itself.

Figure 5:
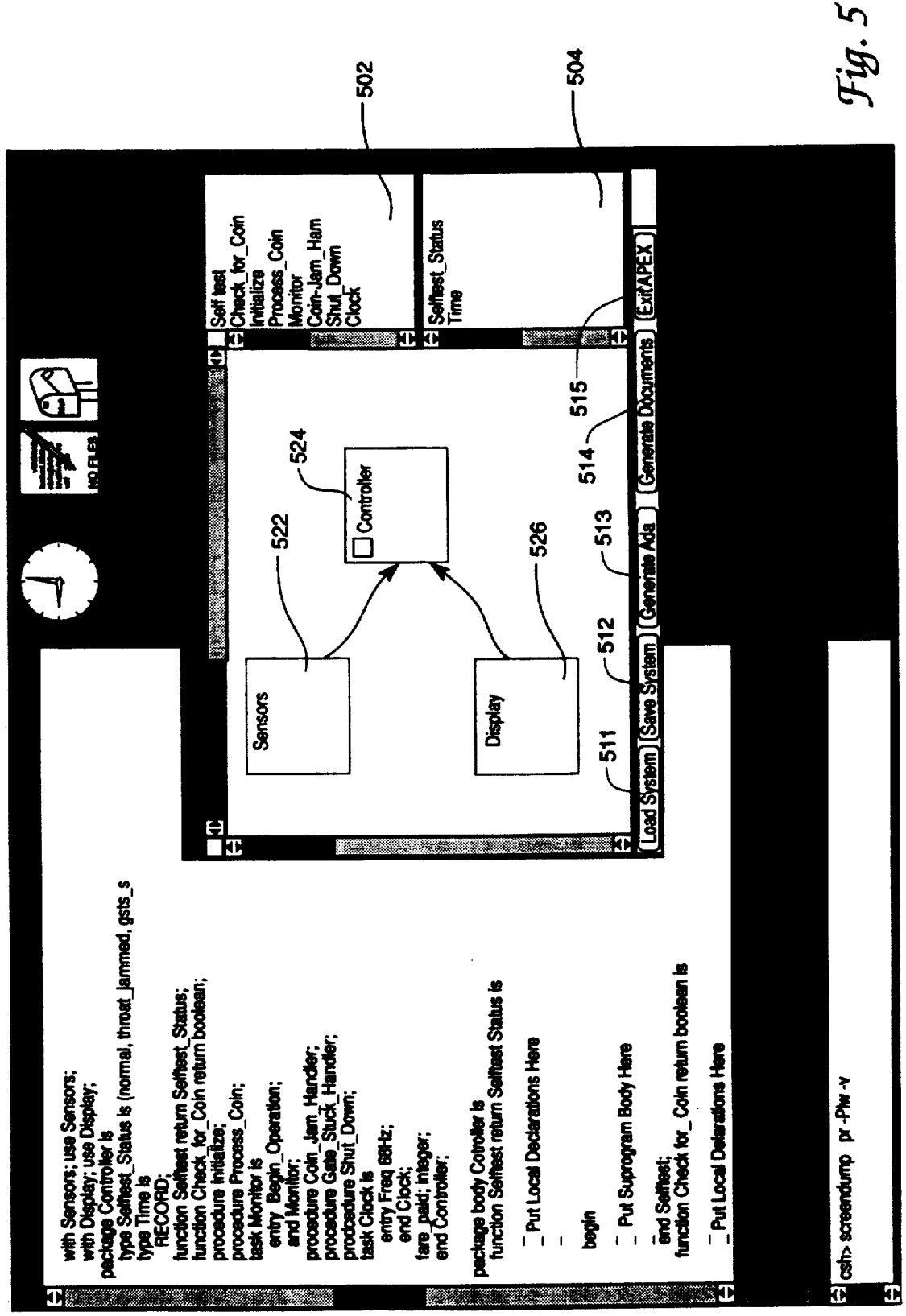
FIGS. 5-8 are screen dumps of APEX displays for a sample system file (turnstile), including an APEX editor view in FIG. 5, a REM-Net editor view in FIG. 6, and a Data Structure editor view in FIG. 7.

The APEX editor permits the user to represent the program's top level package structure, packages contain data structures and the operations (functions, procedures, and tasks) on those data structures. Once created, packages can be connected via transitions. These transitions between packages are the graphical equivalent of Ada with/use statements. A screen dump of a sample APEX editor view is shown in FIG. 5. Once created, a package can be selected (a square by the package name indicates that it has been selected). When selected, the data structures and operations associated with that package will appear in the data structure window 502 (lower right) and operations window 504 (upper right) of the editor, respectively. Additional data structures and operations can be defined using a menu once a package has been selected. Once defined, that item will appear in the appropriate window. When the package is closed, both the object and operations windows will clear.

The operation descriptions in the APEX methodology is limited to tasks, procedures, and functions. The parameters of these can be specified in the pop up menu (50 in FIG. 1) during definition.

Once the data types and operations have been defined, they (in turn) can be selected. To select either an operation or data structure, the user should click the left mouse button when the mouse cursor is directly over the item name in the appropriate window. At this point, a box will be drawn around the item to indicate that it has been selected. Once an item has been selected, it can be edited (click left) or released (click center)

B. Modes of Operation

There are multiple commands listed in the APEX command window (511-515 in FIG. 5). These are described below:

Load System: Command 511 will cause the file specified (on the pop up menu) to be loaded from the file into APEX. There are three types of APEX files which can be read into the editor. The first is a full system, which is a previously saved APEX representation consisting of one or more packages. Loading a full system will cause APEX to reset itself, thereby erasing whatever existed before. The user can also choose to read in an APEX representation containing a single package. When a single package is loaded, an existing package will be added without destroying the existing APEX representation. When loading a single package, the user can position the package on the screen in the same manner as if he were creating it for the first time. The single package option is useful for building a new program from previously specified APEX representations.

The load system option can also be used to load in an Ada package specification from a text file. This feature can only be invoked under special conditions. The first condition is that no other APEX system be loaded when the text file is read in. Second, only one package may be present in the text file loaded. Third, after the text file has been translated to a graphical representation, it must be saved before being loaded again. Once it has been saved, it may be loaded into an existing APEX representation as a single package. This option enables the programmer to reverse engineer an APEX representation from existing Ada code. Section VI of this specification will describe the reverse engineering of code to graphics in more detail.

Save System: Command 512 will cause the current system to be saved to the file specified on the pop up menu.

Generate Ada: Command 513 will cause Ada source code for the current APEX system representation to be generated. All generated code will be sent to the console screen unless the output has been previously redirected to a file.

Generate Documents: Command 514 will generate documentation on the project which is currently loaded. The two documents which are currently produced are a subprogram cross reference (<name>-xref.dox) and a data dictionary describing the function of the program structures (<name>-def.doc).

Exit APEX: Command 515 allows the user to exit the APEX system.

C. Icon Operation

There are several operations associated with the top level icons (such icon 522 in FIG. 5, which represent packages) in the APEX editor; these are described below.

1. Create: Icons can be created if no other icons are currently selected An icon is selected when the square by its name is drawn. To create an icon click the right button on the mouse. A square frame will then appear. Position the square frame at the desired location and click left to permanently position it. At this point, the package menu (50 in FIG. 9) should appear. This menu is used to specify the package name. The creation process can be aborted by selecting the delete option 55 on the Status line of the menu. After the menu has been completed, exit the menu by clicking the mouse with the cursor over the quit option 56.

2. Edit: In order to edit an existing icon, it must be selected. An icon can be selected if the mouse cursor is over it and the square by the name of the package is drawn. At this point, click left to select the icon. Once selected, the user can click left again to bring up a pop up menu with the icon attributes. Editing the menu can change the desired attributes. In order to delete the icon, choose the Delete option on the Status line.

3. Transition: A transition between icons can be easily created. This corresponds to a with/use statement in Ada. In order to make a transition, the initial icon must be selected. Once selected, the user must click the middle mouse button while over the initial icon. The user can then move the mouse cursor until it is over the desired icon and the square of that icon is drawn. At this point the user can click any button to make the transition. The transition skew can be changed by moving the mouse. In order to freeze the desired skew, press any mouse button. The first package is now withed to the second package. Existing transitions can be deleted by following the same procedure used to create them (similar to a toggle switch).

4. Component Creation: Once an icon is selected, clicking right will bring up an options menu. This menu will include options to perform the following operations:

a. Create Operation
   b. Create Data Structure
   c. Invoke Data Structure Editor
   d. Exit Package A package component (operation 502 in FIG. 5 or data structure 504) can be created by making the corresponding choice. Choosing either Create Operation or Create Data Structure will cause the appropriate pop-up menu to appear; these can be used to instantiate the new program components. Once created, the components will appear in either the Program Object or Program Operation window (whichever is applicable).

When an operation is created, the menu components can be used to instantiate a package specification with pop up menu items in the following manner:

| Operation Name | — function {Name} (x: in float) return boolean; |
| | — procedure {Name}; |
| | — task {Name} . . . ; |
| Operation Type | — Select Procedure, Function, or Task. |
| Parameters | — procedure Test ( {parameters} ); |
| Return Type | — function Test return {return type}; |
| Scope | — Select Global or Local. |
| | — Global: in package spec. |
| | — Local: in package body. |

When a data structure is created, the menu components can be used to instantiate a package specification with pop up menu items in the following manner:

| Data Structure Name | — type {Name} . . . ; |
| Data Structure Type | — Select Integer, Float, Boolean, Array, Enumeration, Access, Record. |
| Qualifier | — use as follows: |
| | type {Name} is array {Range} of {Qualifier}; |
| | type {Name} is access {Qualifier}; |
| | type {Name} is ( {Qualifier} ); |
| Range | — Use as follows: |
| | — {Range} → {Lower Range . . . Upper Range} |
| | — subtype {Name} is Integer {Range}; |
| | — subtype {Name} is {Qualifier} {Range}; |

An existing operation or object can be selected by moving the mouse cursor over the desired object and clicking on the left button. A component can be released by pressing the middle mouse button over the appropriate window.

5. Component Editing: Once a component (either an operation or data structure) has been selected, it can be edited by moving the cursor over the appropriate window and clicking on the left mouse button. The menu describing the attributes of that particular component will then appear. The attributes can then be changed as desired. To delete a particular component, select the delete option under the Status section and exit the menu.

6. Invoke REM-Net Editor: (See FIG. 6) Once an operation has been selected, the user can then click the right mouse button over the Program Operation window to enter the REM-Net editor. The REM-Net editor frame should then appear. All editors (APEX, REM-Net and Data Structure) can be viewed and edited at the same time.

7. Invoke Data Structure Editor: (See FIG. 7) Once a package has been selected, the Data Structure editor can be invoked by making the appropriate choice on the options menu for the selected package. Picking the Data Structure Editor choice will cause the Data Structure editor frame to appear. All editors can be viewed at the same time.

8. Leave Selected package: To leave a selected package, bring up the options menu and choose the Exit package option.

Figure 6:
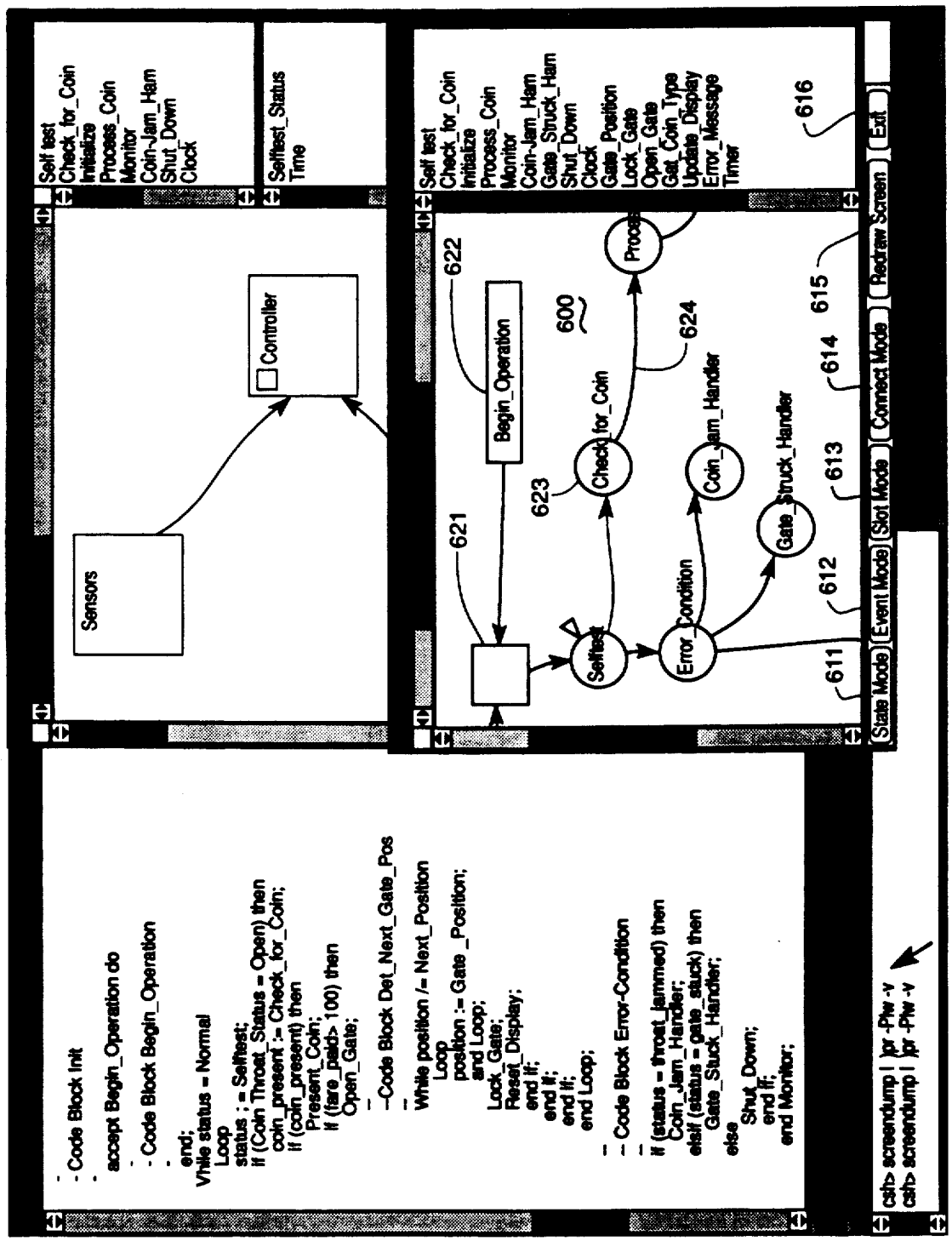

IV. REM-Net Editor (FIG. 6)

A. Explanation of Methodology

One of the main drawbacks of many popular graphical design methodologies is that they are so high level that many important features of the language they support are not represented. This is extremely frustrating for the serious programmer. For example, if there is no convenient way to specify rendevous at the subprogram body level, then a programmer's ability to properly design an Ada application has substantially diminished. The REM-Net editor provides support for a large number of important Ada language constructs; in many cases there is a direct mapping between the graphical icons and the language constructs themselves.

The REM-Net editor 600 makes use of four main icons on the command window 611-616 in its design scheme; which are described below.

States: States represent an action or sequence of actions in the normal program control flow. In Ada this can take a variety of forms. Specifically, a state can represent the following types a procedure call
a function call
a code block
a raise exception statement
a rendevous statement When a state is created, the user can select the appropriate options from a pop-up menu; it is by editing this menu that the user can alter the functionality of a given state. One of the options that can be selected on this menu is the state type. Other attributes of the state (such as name, parameters and return parameter) can also be specified at this time. When code generation takes place, the Ada source corresponding to the information within the icon will be produced. In the case of a procedure or function call, the appropriate call will be generated. In the case of a code block, a place holder (in the form of a comment block) will be generated. The comment block can be filled in later with a text editor. In this respect, the REM-Net editor can be used to generate PDL (program Design Language) since the entire subprogram body need not be specified at the time of code generation; important details of the design can be deferred until a later stage of development, if desired. This can be an especially important feature when designing reusable subprogram modules.

Events: Events represent Ada select or accept statements. Events can have a delay associated with them. This information can be added during event creation with the pop-up menu.

Slots: Slots represent paths of communication between tasks. A slot which transitions to an event (select Statement) is considered an entry in Ada. A slot which received a transition from a rendevous state is considered a rendevous call to another task. A slot can have either incoming or outgoing transitions (not both).

Transitions: Transitions describe the conditions whereby control will be passed to another state. Transitions between states can represent while statements, for/in statements, loops, or unconditional flow of control. If the transition is a loop, it must originate at the end of the proposed loop and transition to the loop's beginning. Each state must have at least one unconditional transition originating from itself if any more code is to be generated for a given code sequence.

B. Modes of Operation

There are four basic modes of operation for the REM-Net editor (described below). Each mode can be entered by clicking on the button with the same name in the REM-Net command pane 611–616.

State Mode: (command 611) In this mode, the programmer can create and edit states (such as state 623). In addition, transitions between states and all other icons can be specified. This is the default mode. The initial state is chosen in this mode as well.

Event Mode: (command 612) In this mode, the programmer can create and edit events (such as event 621). Events represent Ada select or accept statements (depending on the number of slot transitions to a particular event). Transitions emanating from events can only go to a state. Events can receive transitions from either slots (if they represent incomming rendevous or states). Transitions between events and states should only be designated as unconditional.

Slot Mode: (command 613) In this mode, the programmer can create and edit slots (such as slot 622). Slots represent different "ends" of a rendevous. The rendevous is started by creating a slot in the task which accepts the rendevous call; this slot represents an entry into the task. Once a slot is created in the accepting task, other subprograms can then rendevous with that slot. The rendevous is completed by creating a copy of a slot (in the subprogram which will make the rendevous call) that exists in the accepting task (this is done using the Connect Mode). Any slot (once created) can be edited in the Slot Mode.

Connect Mode: (command 614) In this mode, the programmer can create rendevous calls to existing entries defined in other tasks. This is equivalent to making a call to an entry in an existing task. The entry must be established in the task before the programmer can make a call to it. In addition, the Connect Mode can also be used to draw entries which have been defined as a result of reading in a package specification. In this case, the entries will exist, but no slot will have yet been created to represent them in the task's REM-Net diagram.

C. Icon Operations

States: (623)

1. Create: Enter State Mode (default Mode). A state may be created by moving the mouse cursor to the desired position in the window and clicking the right mouse button. At this point a pop-up menu should appear; the user can then fill in the attributes of the state and quit the menu when done. The image of the state should now appear on the screen. A state which represents a specific function or procedure call can also be created. This is accomplished by picking the desired subprogram from the Visible Subprograms window (move mouse directly over the listed item and click the left mouse button; a box will appear around the chosen subprogram). The state can then be created using normal procedures. When the state's pop-up menu appears, the attributes will be filled in to reflect those of a call to the chosen subprogram.

2. Edit: Place mouse cursor inside the desired state. A box should be drawn around the state. At this point, click the left mouse button. A menu describing the state should appear, make the desired changes, then exit.

3. Delete: Perform an Edit State operation. At this point, choose the Delete option under the Status keyword. Exit the menu. The state and all associated transitions should now be deleted.

4. Transition (624): Place the mouse cursor inside the desired transition start state. A box should be drawn around the state. At this point, click the middle button. The start state for the transition is now selected. Move the cursor to the next desired icon. The icon will become highlighted when the mouse cursor is inside it. At this point press the middle mouse button to complete the transition. The connection line 624 should now appear. The user can change its skew as desired by moving the mouse cursor; click any mouse button to freeze the skew in place. A menu which describes the transition attributes will appear after the transition skew has been determined. The user should fill in the menu attributes and exit the menu. The transition is now complete. Transitions between states and slots should only be done when the transition type is a rendevous and the rendevous emulates from the current subprogram.

5. Initial State Once the REM-Net diagram has been completed, it is important to select an initial state. Without selecting an initial state, the Ada code for that particular subprogram will not be generated properly; for this reason, it is important for the programmer to remember to do this. In order to select an initial state, place the mouse cursor over the desired state. After the state becomes highlighted, click the right mouse button once; the initial state for the subprogram has now been selected. If the right mouse button is not over a highlighted state when pressed, then a new state will be created instead.

Events: (621)

1. Create: Enter State Mode. To create an event, move the mouse cursor to the desired position and click on the right mouse button. The pop-up menu will appear for the event attributes. There is only one important attribute for events (the delay specification). After the menu has been exited the event should be complete.

2. Edit: place the mouse cursor inside the desired event. The event should highlight. At this point, click left the on the mouse buttons. A pop-up menu describing the event should appear. Edit as desired.

3. Delete: Follow the edit event procedure. Choose the delete option on the Status line and exit the menu. The event and all associated transitions should be deleted.

4. Transition (624): Move the mouse cursor inside an existing event. The event should highlight. Click the middle button on the mouse to start the transition. The event must transition to a state. Move the mouse cursor inside the desired state and click the middle mouse button to complete the transition. Click any button to freeze the transition skew. When the transition menu appears, exit the menu without modification. Transitions between events and states should be unconditional by default.

Slots: (622)

1. Create: A slot must initially be created in the REM-Net diagram of the task that accepts the rendevous. After the initial slot has been created, subprograms can specify a rendevous to the existing entry using the Connect Mode. To create a slot which represents an entry, the present REM-Net diagram must be that of a task and the Slot Mode should be selected. Once this has been done, the user can move the mouse cursor to the position where the slot is desired and press the right mouse button to create the slot. The slot menu should them appear. The user should fill in the name and parameter declaration for the slot. The quit button is used to exit the menu.

The Connect Mode can be used to create a slot in two distinct cases. The first case occurs when the programmer wishes to represent a call to an existing entry. The user should move the mouse cursor to the Visible Subprogram window and select the task with which a rendevous is desired. Once selected, the user should press the right mouse button to get a list of entries declared for the chosen task. When the desired entry is selected, the user should move the mouse cursor to the main window and create the slot by pressing the right mouse button when the mouse cursor is in the desired position.

The second case occurs when the programmer has read in the Ada code for a package specification. When the package specification contains a task with entries, it is necessary to position the slot icons which correspond to the entries within the task's REM-Net diagram. This is accomplished in the Connect Mode in the same manner as that outlined in the previous paragraph.

2. Edit: To edit an existing slot, move the mouse cursor inside the existing slot. At this point a square should be drawn in front of the slot name. Now press the left mouse button to bring up the slot attribute of the slot name. Now press the left mouse button to bring up the slot attribute menu. Edit the slot attributes as desired. If a slot attribute (such as slot name or parameters) is changed for the original entry, that change should propagate to its related slots in the sending or receiving subprograms. If the slot being edited does not represent the original entry, then none of the attributes will be changed as a result of the edit. The programmer cannot change the name of the receiving task when editing a given slot.

3. Delete: To delete a slot, perform the same procedure as described for editing a slot. When the slot attribute menu appears, choose the Delete option under the Status section of the menu. Exit the menu. The slot and all corresponding connections should now disappear. If the original entry is deleted, any related slots in other subprograms should disappear as well. In this manner, consistency between different subprogram diagrams is maintained. The deletion of a slot has the effect of cancelling a rendevous between a subprogram and a task.

4. Transition (624): Move the mouse cursor inside an existing slot. The slot should highlight. Click the middle button on the mouse to start the transition. The only transition possible is from a slot to an event. Place the cursor inside the desired event (which should highlight) and click any button to complete the transition. Fill in the pop up menu to instantiate the transition (only the guard attribute is important). This transition will represent the actions performed in the accept statement block which corresponds to that particular entry (slot). Transitions coming in to slots may only be from states which are of type rendevous. A safeguard is incorporated into the software to prevent "stupid mistakes" for slot transitions. For example, the system will ignore a user's attempt to connect an outgoing rendevous slot (to another task) to an event within the present task.

V. Data Structure Editor (FIG. 7)

A. Explanation of Methodology

Figure 7:
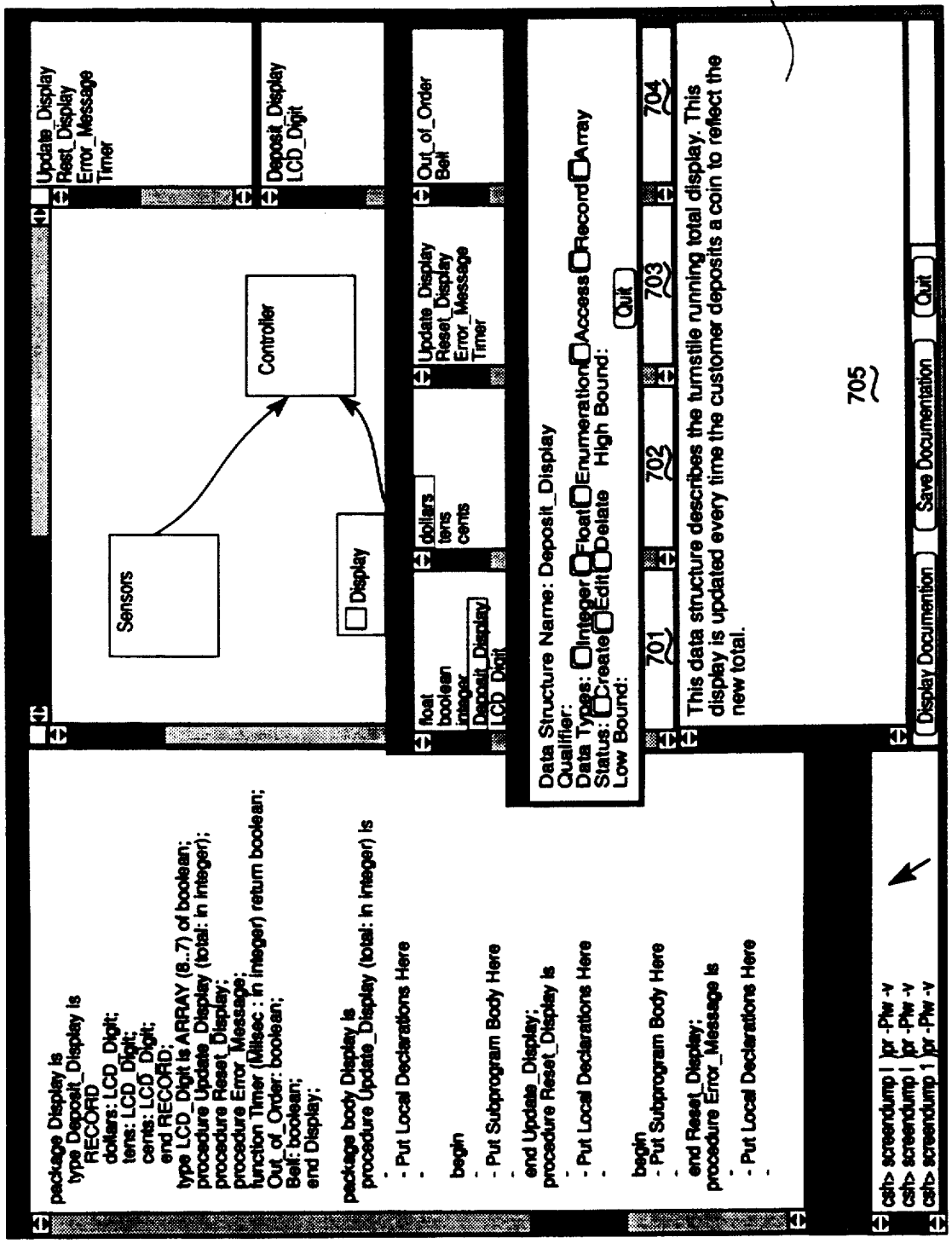
Figure 8:
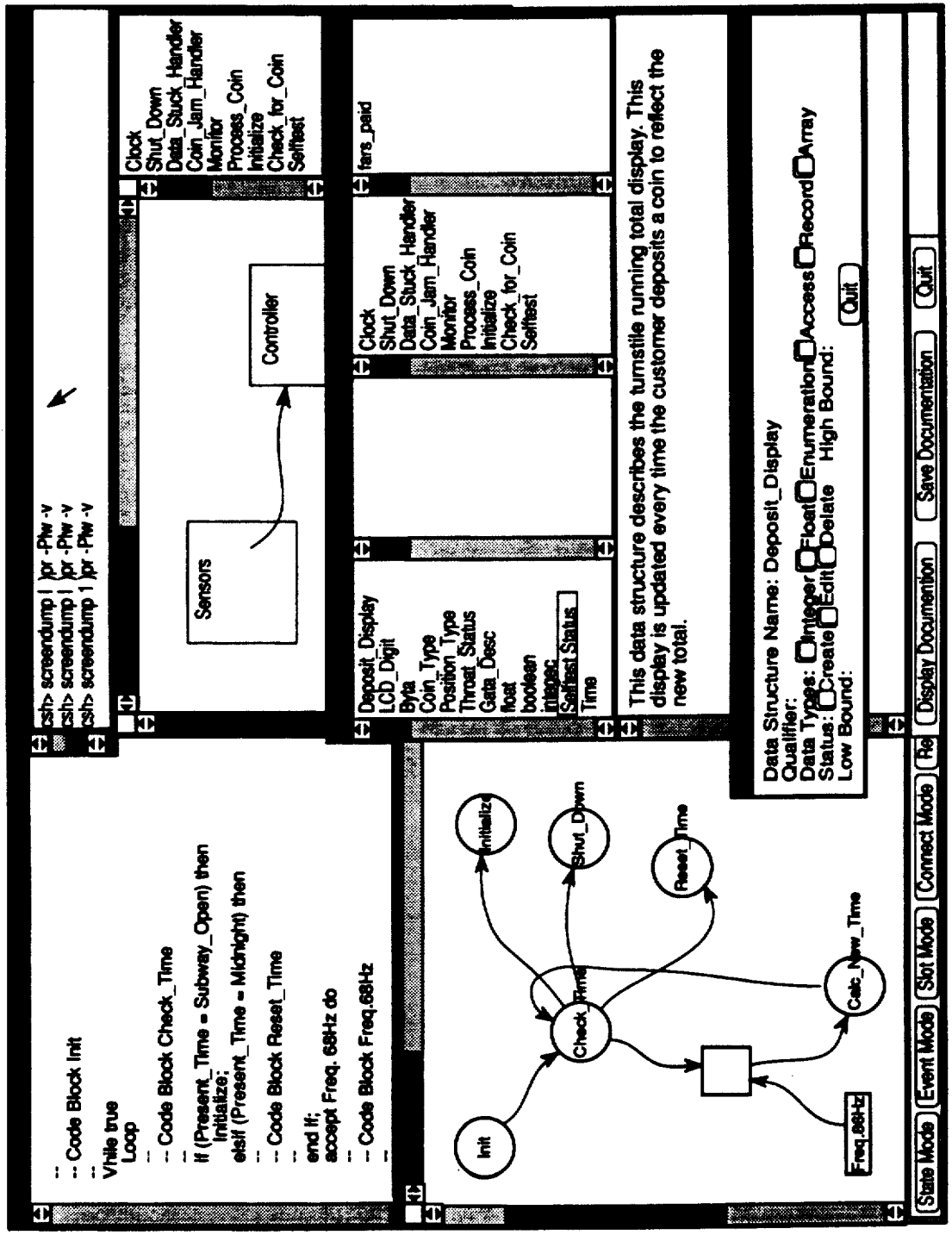

A screen dump of the DS editor is shown in FIG. 7. The data Structure editor 700 provides the means of manipulating those data structures created using the APEX editor. The following examples illustrate how the menu choices are used in defining some sample data structures.

| | |
|---|---|
| Data Structure Name | — type (Name) . . . ; |
| Data Structure Type | — Choose between (Integer, Float, Array, Enumeration, Access, Record); type {Name} is {Type} . . . ; |
| Qualifier | — Use as Follows: type {Name} is array {Range} of {Qualifier}; type {Name} is {Qualifier}; |
| Range | — Use as Follows: {Range} → {Lower Range . . . Upper_Range}; subtype {Name} is Integer {Range}; subtype {Name} is {Qualifier} {Range}; |

Once the data types have been created, the programmer can then edit them using the DS editor. The DS editor 700 has six windows; the function of and location of each window is described below:

Visible Data Structure pane 701 (far left): Provides a list of data structures which are visible to the currently selected package.

Record Field pane 702 (middle left): Provides a list of fields within the currently selected data structure (if the data structure is a record type).

Package Subprogram pane 703 (middle right): List of subprograms in the selected package (middle right).

Variable pane 704 (far right): List of variables which are in the selected subprogram or the currently selected package.

Documentation window 705 (bottom): Provides a mechanism to document existing subprograms, data structures or variables.

Using these windows the user can perform the following operations:
1. Select a visible data structure.
2. Edit the selected data structure.
3. Create/Display/Edit all the local variables inside a visible subprogram which are instances of a selected data structure.
4. Create/Display/Edit all the fields within a given record.
5. Create/Display/Edit documentation for all program structures.

B. Modes of Operation

The mode of operation in the DS editor 700 is heavily dependent on which pane (701-705) the mouse is in at any given time. For example, variables can only be manipulated (created, edited; or deleted) in the Variable pane. The operations which can be carried out on the icons are related to the panes in the following manner:

Variable Data Structure pane: Data structure operations {edit or delete data structures}.

Record Field pane: Record field operations {create, edit or delete data structures}.

Package Subprogram pane: Operations on subprograms which are within the selected package {edit or delete subprograms}.

Variable pane: Operations on variables which are either inside the package or inside a particular subprogram {create, edit or delete variables}.

Documentation pane: Allows the user to enter/edit text to describe program structures.

Command pane: The Data Structure editor can be closed by pressing the Quit button in the command pane using the mouse.

C. Icon Operations

Data Structures:

1. Edit: To edit a data structure, move the mouse cursor over the Data Structure pane. Select the desired data structure by placing the mouse cursor directly over it and click the left mouse button. A box should then be drawn around the data structure. To release a selected data structure, click the middle mouse button; the box around the data structure should now disappear. Once a data structure has been selected, click right on the mouse. A menu frame with the data structure attributes should now appear. The attributes can be modified as desired. Use the Quit button to exit the menu frame.

3. Delete: In order to delete a record field entry, the user must follow the same procedure as to edit an entry. Once inside the edit frame, the user must select the Delete option on the Status portion of the menu. After the user quits the menu, the record field will be deleted from the selected data structure.

Subprograms:

1. Edit: A subprogram can be edited or deleted in the Data Structure editor. In order to edit the subprogram, it must be selected (the method of selection is similar to that used in the other panes). Once selected, the user must press the right mouse button to edit the subprogram. The menu frame for the chosen subprogram will appear at this point. When finished, the user can press the Quit button in order to exit the menu frame.

2. Delete: A subprogram can be deleted by choosing the Delete option under the Status section in the menu frame. After the menu is exited by the user, the chosen subprogram will be deleted.

Variables:

Operations can be performed on variables either at the package or subprogram level. When no subprograms are selected, the variable list reflects package variables. When a subprogram is selected, the Variable pane 704 contains variables local to the chosen subprogram.

1. Create: To create a variable, a type for the variable (taken from the Data Structure pane) must first be selected. Once this is done, the user must move the mouse into the variable pane and click right to instantiate that data type. The menu frame for the new variable will then appear. The user can only edit the name of the variable; the type is fixed. If the user desires to change the type of the variable, the present entry must be deleted and a new one created. To exit the menu frame, the user must press the Quit button using the mouse. The Variable pane should update to reflect the new entry.

2. Edit: In order to edit a given variable, the subprogram that the variable is inside must be selected. If the variable is in the current package itself, then no subprograms can be selected. Once the appropriate variable list appears in the Variable pane 704, the desired variable can be chosen (left click of the mouse over the entry) and edited (followed by a right click). Again, only the variable name can be edited. The menu can be exited by using the Quit button.

3. Delete: the entry can be deleted by choosing the Delete option under the Status section of the variable menu frame. After the menu frame is exited, the Variable pane should update to reflect the deletion.

D. Documentation

While in the Data Structure editor 700, documentation can be produced for the following program structures:

Subprograms
Data Structures
Variables (global and local)
Record Fields

1. Create Documentation: After a program structure has been created, edit it by bringing up the menu which describes its attributes. After this has been done, use the mouse to press the Display Documentation button on the command pane. If no documentation exists, then the documentation window should remain blank, but the cursor should activate. Type in the desired comments. When finished, save the comments by depressing the Save Documentation button on the command pane. Be sure to leave the attribute menu up while creating the documentation.

2. Edit Documentation: Select and edit the attributes of a program structure. After the attribute menu has appeared, depress the Display Documentation button on the command pane. Any existing documentation for that program structure should then appear in the documentation pane. The user can then edit the text as required. The documentation can be saved by depressing the Save Documentation button on the command pane.

VI. Reverse Engineering Capability

A. Explanation of Methodology

APEX provides the programmer with the ability to create the graphical representation of his code from an existing Ada package specification. Although this capability is still somewhat limited, it does provide a way of reusing Ada source code which is already in existence.

An Ada package specification is the code which describes the portion of a package which can be referenced by a separate program unit. By reverse engineering a package specification for existing software, the application being developed with APEX can make full use of routines and data structures within that package without the programmer having to manually specify the existing code. Since the reverse engineering process is automated, the programmer has a minimal amount of overhead involved with reusing existing software to develop a new application with APEX.

B. prerequisites for Use

The following prerequisites must be satisfied in order to reverse engineer an Ada package specification:

1. The package specification must have been compiled without error by a validated Ada compiler.
2. There must only be one package specification per file read in. This means only one specification can be read in at a time. There should be nothing else in the file but the package specification.
3. After the package specification has been read in, it must be saved by APEX before it can be reused with another APEX representation. It can be subsequently read in as a single package or a full system.
4. The Ada features which are presently supported for reverse engineering are currently as follows:
   package declarations;
   task declarations;
   function declarations;
   procedure declarations;
   entry declarations;
   variable declarations;
   enumeration type declarations;
   array type declarations;
   record type declarations;
   access type declarations;
   integer subtype declarations (reference Ada LRM sections);
   enumeration subtype declarations;
5. Those Ada features which are presently supported are as follows:
   variant record declarations;
   constants;
   fixed point declarations;
   floating point declarations (reference Ada LRM sections);
   derived type declarations (except for enumeration types);
   initialization of variables/components;
   string type declarations;
   unconstrained array declarations;

C. Mode of Operation

Load System: The Load System option (on the APEX editor command pane) can be used to load in the Ada package specification. After the specification has been read in, a package frame will appear. To position the frame, click the left mouse button. The programmer can then select the package in order to inspect its contents. A sample file (tproc.ada) is included to illustrate the reverse engineering capability.

Save System: After the package specification has been loaded, it can be saved using APEX. This is necessary for reusing it with an existing APEX representation.

Connect Mode: If the package specification which has been read in contains a task with entries, then the user must create slots which correspond to those entries in the appropriate task. The procedure for doing this is outlined in Section IV.

VII. Sample File

A sample APEX system file (turnstile) is supplied with the tape. This can be loaded into the APEX system by using the System Load option in the APEX command pane. The user can then learn about the system by experimenting with this sample program. The graphical views produced from this file are shown in the drawings, FIGS. 5, 6, 7 and 8. This should be a useful tool in understanding the methodology presented in sections III, IV and V.

The sample file follows:

```
package Display is
   type Deposit_Display is
      RECORD
         dollars: LCD_Digit;
         tens: LCD_Digit;
         units: LCD_Digit;
      end RECORD;
   type LCD_Digit is ARRAY (0 . . . 7) of boolean;
   procedure Update_Display (total: in integer);
   procedure Reset_Display;
   procedure Error_Message;
   function Timer (Milsec: in integer) return boolean;
   Out_of_Order: boolean;
   Bell: boolean;
   end Display;
package body Display is
   procedure Update_Display (total: in integer) is Put Local Declarations Here
   —
   begin
   —
   — Put Subprogram Body Here
   —
   end Update_Display;
procedure Reset Display is Put Local Declarations Here
   —
   begin
   —
   — Put Subprogram Body Here
   —
   end Reset_Display;
procedure Error_Message is
   —
   Put Local Declarations Here
   —
   begin
   —
   — Put Subprogram Body Here
   —
   end Error_Message;
function Timer (Milsec: in integer) return boolean;

Put Local Declarations Here
   —
   begin
   —
   — Put Subprogram Body Here
   —
```

```
            While count > 0
              Loop
                —
                — Code Block Delay_1ms
                —
                —
                — Code Block Decrement_Count
                —
              end Loop:
                —
                — Code Block return true
                —
              end Timer:
            end Display;
         package Sensors is
            type Byte is ARRAY (0 ... 7) of boolean;
            type Coin_Type is (nickel,dime,quarter,slug);
            type Position_Type is (one,two,three,four);
            type Throat_Status is (open,closed);
            type Gate_Desc is
              RECORD
                Position: Position_Type;
                Open: boolean;
              end Record;
            function Gate_Position return Position_Type;
            procedure Lock_Gate;
            procedure Open_Gate;
            function Get_Coin_Type return Coin_Type;
            Gate: Gate_Desc;
         end Sensors;
         package body Sensors is
            function Gate_Position return Position_Type is
              —
              Put Local Declarations Here
              —
              begin
              —
              — Put Subprogram Body Here
              —
              end Gate_position;
            procedure Lock_Gate is
              —
              Put Local Declarations Here
              —
              begin
              —
              — Put Subprogram Body Here
              —
              end Lock_Gate;
            procedure Open_Gate is
              —
              Put Local Declarations Here
              —
              begin
              —
              — Put Subprogram Body Here
              —
              end Open_Gate;
            function Get_Coin_Type return Coin_Type is
              —
              Put Local Declarations Here
              —
         Coin_Size_Sensor: Byte;
         coin: Coin_Type;
              begin
              —
              — Put Subprogram Body Here
              —
              — Code Block Read_Size_Sensor
              — if (coin_size_sensor(7) = true) then
              —
              — Code Block coin = quarter
              —
              — elseif (coin_size_sensor(5) = true) then
              —
              — Code Block coin = nickel
              — elseif (coin_size_sensor(5) = true) then
              —
              — Code Block coin = nickel
              — elseif (coin_size_sensor(3) = true) then
              —

— Code Block coin = dime
              — else
              —
              — Code Block coin = other
              end if
              —
              — Code Block return type
              —
            end Get_Coin_Type;
         end Sensors;
            with Sensors; use Sensors;
            with Display; use Display;
         package Controller is
            type SelfTest_Status is (normal, throat_jammed, gate_stuck, other);
            type Time is
              RECORD
                Hours: integer;
                Minutes: integer;
                Seconds: integer;
              end RECORD;
            function Selftest return SelfTest_Status;
            function Check_for_Coin return boolean;
            procedure Initialize;
            procedure Process_Coin;
            task Monitor is
              entry Begin_Operation;
              end Monitor;
            procedure Coin_Jam_Handler;
            procedure Gate_Stuck_Handler;
            procedure Shut_Down;
            task Clock is
              entry Freq_60 Hz;
              end Clock;
            fare_paid: integer;
         end Controller;
         package body Controller is
            function Selftest return SelfTest_Status is
              —
              Put Local Declarations Here
              —
              begin
              —
              — Put Subprogram Body Here
              —
              end SelfTest:
            function Check_for_Coin return boolean is
              —
              Put Local Declarations Here
              —
              begin
              —
              — Put Subprogram Body Here
              —
              end Check for_Coin;
            procedure Initialize is
              —
              Put Local Declarations Here
              —
              begin
              —
              — Put Subprogram Body Here
              —
              Reset_Display;
              Lock_Gate;
              —
              — Code Block_Open_Coin_Throat
              Monitor.begin_Operation;
              end Initialize;
            procedure Process_Coin is
              —
              — Put Local Declarations Here
              —
              coin: Coin_Type;
              coin_value: integer;
              begin
              —
              — Put Subprogram Body Here
              —
              coin := Get_Coin_Type;
              if (coin = nickel) then
              —
```

```
                -- Code Block value = 5 elseif (coin = dime) then

-- Code Block value = 10 elseif (coin = quarter) then

-- Code Block value = 25 else

-- Code Block value = 0 end if;
   Update_Display (coin_value);
   end Process_Coin;
task body Monitor is -- Put Local Declarations Here Next_Position: Position_Type;
   status: SelfTest_Status;
   coin_present: gboolean;
   Position: Position_Type;
begin -- Put Subprogram Body here -- Code Block Init accept Begin_Operation do -- Code Block Begin_Operation end;
   While status = Normal
     Loop
       status := SelfTest;
       if (Coin_Throat_Status = Open) then
         coin_present := Check_for_Coin;
         if (coin_present) then
           Process_Coin;
           if (fare_paid > 100) then
             Open_Gate;

-- Code Block Det_Next_Gate_Pos position := Gate_Position;
             While position /= Next_Position
               Loop;
                 position := Gate_Position;
               end Loop;
             Lock_Gate;
             Reset_display;
             end if;
           end if;
         end if;
       end Loop;

-- Code Block error_Condition if (status = throat_jammed)) then
     Coin_Jam_Handler;
   elseif (status = gate_stuck) then
     Coin_Stuck_Handler;
   else
     Shut_Down;
   end if;
   end Monitor;
procedure Coin_Jam_Handler is -- Put Local Declarations Here begin -- Put Subprogram Body Here
   end Coin_Jam_Handler;
procedure Gate_Stuck_Handler is -- Put Local Declarations Here begin -- Put Subprogram Body Here end Gate_Stuck_Handler;
procedure Shut_Down is -- Put Local Declarations Here begin -- Put Subproqram Body Here end Shut_Down;
task body Clock is -- Put Local Declarations Here Present_Time: Time;
   Subway_Close: Time;
   Subway_Open: Time;
   Midnight: Time;
   begin -- Put Subprogram Body Here -- Code Block ;Init
   While true
     Loop -- Code Block Check_Time if (Present_Time = Subway_Open) then
         Initialize;
       elseif (Present_Time = Subway_Close) then
         Shut_Down;
       elseif (Present_Time = Midnight) then -- Code Block reset_Time end if;
       accept Freq_60_Hz -- Code Block Freq_60 Hz end;

-- Code Block Calc_New_Time end Loop;
   end Clock;
end Controller;
```

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method of automatic code generation for the Ada programming language, which provides a User with the ability to quickly create a graphical representation of an initial program design, the graphical representation being in a form from which the Ada code is generated and then compiled;

wherein the representation provides a User with a plurality of different but consistent views of an Ada program, with graphic symbols representing objects defined as entities including constants and variables having values, wherein the objects include packages, operations, data types, states, slots, events and connections as defined for the Ada language, and wherein operations comprise tasks, procedures and functions;

wherein said method comprises the steps:

using a first editor for providing a first view wherein the User defines an initial Ada package specification, using a combination of graphical means and text, using a second editor for providing a second view with which the User creates and manipulates complex data structures and defines local variables, data structures and local variables being used in the Ada program, and using a third editor for providing a third view with which the User defines the control flow of a specific subprogram; and using first, second and third event handlers for the first, second and third editors respectively;

using the first editor and first event handler to create, select, edit and delete graphic symbols, including graphic symbols representing packages, and to create connections between graphic symbols which correspond to Ada with and use statements, and to create package operations and data structures, inserting graphic symbols into the data of the common data base, and updating data in a common data base for objects which have been edited and not deleted;

using the third editor and third event handler to create, select, edit and delete graphic symbols representing states, events, slots and transitions, wherein states represent actions or sequences of actions including procedure calls, function calls, code blocks, raise exception statements, and rendezvous statements, wherein events represent Ada select or accept statements, wherein slots represent paths of communication between tasks, and wherein transitions describe conditions whereby control is passed to another state, wherein transitions between states include while statements, for/in statements, loops, and unconditional flow of control, and updating data in the common data base for objects which have been edited and not deleted;

using the second editor and second event handler to create, select, edit and delete graphic symbols representing the data structure, and updating data in the common data base for objects which have been edited and not deleted;

entering a "generate Ada" command with the first editor to initiate Ada source code generation for the Ada packages defined for the Ada program, using templates which are generic structure types having a plurality of data members, there being a template for each type of object, Ada code being generated in the system by declaring specific data structures of the template types with allocation of memory, traversing said common database, extracting relevant information needed to produce the Ada code from each object in the common database and inserting the relevant information into members of the specific data structures, and executing a print function with the data members of the templates as parameters.

2. A method of automatic code generation for the Ada programming language, which provides a User with the ability to quickly create a graphical representation of an initial program design, the graphical representation being in a form from which the Ada code is generated and then compiled;

wherein the representation provides a User with a plurality of different but consistent views of an Ada program, with graphic symbols representing objects defined as entities including constants and variables having values, wherein the objects include packages, operations, data types, states, slots, events and connections as defined for the Ada language, and wherein operations comprise tasks, procedures and functions;

wherein said method comprises the steps:

using a first editor for providing a first view wherein the User can define an initial Ada package specification, using a combination of graphical means and text, using a second editor for providing a second view which allows the User to create and manipulate complex data structures and define local variables, data structures and local variables being used in the Ada program, and using a third editor for providing a third view which allows the User to define the control flow of a specific subprogram; and using first, second and third event handler means for the first, second and third editor means respectively;

using the first editor and first event handler to create, select, edit and delete graphic symbols, including graphic symbols representing packages, and to create connections between graphic symbols which correspond to Ada with and use statements, and to create package operations and data structures, inserting graphic symbols into the data of the common data base, and updating data in a common data base for objects which have been edited and not deleted;

using the third editor and third event handler to create, select, edit and delete graphic symbols representing states, events, slots and transitions, wherein states represent actions or sequences of actions including procedure calls, function calls, code blocks, raise exception statements, and rendezvous statements, wherein events represent Ada select or accept statements, wherein slots represent paths of communication between tasks, and wherein transitions describe conditions whereby control is passed to another state, wherein transitions between states include while statements, for/in statements, loops, and unconditional flow of control, and updating data in the common data base for objects which have been edited and not deleted;

using the second editor and second event handler to create, select, edit and delete graphic symbols representing the data structure, and updating data in the common data base for objects which have been edited and not deleted;

entering a "generate Ada" command with the first editor to initiate Ada source code generation for the Ada packages defined for the Ada program, using template types which are generic structure types having a plurality of data members, there being a template type for each type of object, comprising selecting one package at a time, starting with packages having connections, declaring specific data structures of the template types with allocation of memory, filling in specific data structures and executing a print function using those specific data structures for data structure objects of the selected package, filling in specific data structures for a selected package and executing the print function using those specific data structures for variable objects of the selected package, filling in specific data structures for a selected variable object and executing the print function using those specific data structures for operation objects of the selected package; and filling in specific data structures for a selected package body and executing the print function using those specific data structures for generating code for the package body of the selected package, including generating Ada code for states, generating Ada code for events, generating Ada code for transitions, ordering third-editor graphic symbols to reflect the logical ordering of the subprogram, and sorting transitions, based on the graphic symbol ordering, to reflect the level of loop nesting.

* * * * *

UNITED STATES PATENT AND TRADEMARK OFFICE
CERTIFICATE OF CORRECTION

PATENT NO. : 5,187,788

DATED : February 16, 1993

INVENTOR(S) : Robert E. Marmelstein

It is certified that error appears in the above-identified patent and that said Letters Patent is hereby corrected as shown below:

Column 7, line 13, the second period should be a comma.
Column 7, line 17, -- APEX -- should precede "should".
Column 7, line 17, a period should follow "systems".
Column 10, line 50, the comma should be a period.
Column 10, line 50, the second occurrence of "for" should be capitalized.
Column 12, line 19, "too" should be -- to --.
Column 16, line 55, " n"," should be -- \n", --
Column 16, lines 67-68, delete "provides a template for the structure without actually reserving".
Column 17, line 20, "described" should be -- describes --.
Column 17, line 53, a period should follow "structure".
Column 17, line 53, "packages" should be capitalized.
Column 18, line 14, a period should follow "center)".
Column 18, line 62, "dox" should be -- doc --.
Column 19, line 4, a period should follow "selected".
Column 20, line 47, "package" should be capitalized.
Column 20, line 49, "package" should be capitalized.
Column 21, line 4, a colon should follow "types".
Column 21, line 24, "program" should be capitalized.
Column 22, line 45, the comma should be a period.
Column 22, line 67, a colon should follow "State".
Column 23, line 17, a comma should follow "exited".

UNITED STATES PATENT AND TRADEMARK OFFICE
CERTIFICATE OF CORRECTION

PATENT NO. : 5,187,788

DATED : August 16, 1993

INVENTOR(S) : Robert E. Marmelstein

It is certified that error appears in the above-identified patent and that said Letters Patent is hereby corrected as shown below:

Column 23, line 18, "place" should be capitalized.
Column 27, line 24, "prerequisites" should be capitalized.
Column 32, line 12, correct the spelling of "Subprogram".

Signed and Sealed this

Seventeenth Day of May, 1994

*Attest:*

BRUCE LEHMAN

*Attesting Officer*  *Commissioner of Patents and Trademarks*